United States Patent
Da Silva et al.

(10) Patent No.: US 10,945,273 B2
(45) Date of Patent: Mar. 9, 2021

(54) APPARATUS, SYSTEM AND METHOD OF BEAMFORMING AND BEAM TRACKING

(71) Applicant: INTEL IP CORPORATION, Santa Clara, CA (US)

(72) Inventors: Claudio Da Silva, Portland, OR (US); Cheng Chen, Portland, OR (US); Artyom Lomayev, Nizhny Novgorod (RU); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/727,130

(22) Filed: Dec. 26, 2019

(65) Prior Publication Data

US 2020/0137767 A1 Apr. 30, 2020

Related U.S. Application Data

(63) Continuation of application No. 16/194,639, filed on Nov. 19, 2018, now Pat. No. 10,638,493.
(Continued)

(51) Int. Cl.
*H04W 72/08* (2009.01)
*H04B 7/06* (2006.01)
(Continued)

(52) U.S. Cl.
CPC ......... *H04W 72/085* (2013.01); *H01Q 3/005* (2013.01); *H04B 7/063* (2013.01);
(Continued)

(58) Field of Classification Search
None
See application file for complete search history.

(56) References Cited

U.S. PATENT DOCUMENTS

2019/0090253 A1  3/2019  Da Silva et al.
2019/0288760 A1* 9/2019  Li .................. H04B 17/11
(Continued)

OTHER PUBLICATIONS

IEEE Std 802.11™-2016. IEEE Standard for Information technology— Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
(Continued)

*Primary Examiner* — Hong S Cho
(74) *Attorney, Agent, or Firm* — Shichrur & Co.

(57) ABSTRACT

For example, a first Enhanced Directional Multi-Gigabit (DMG) (EDMG) station (STA) may be configured to exchange first and second Beam Refinement Protocol (BRP) setup frames with a second EDMG STA to initiate a BRP Transmit Sector Sweep (TXSS) over an aggregated channel bandwidth including an aggregation of a primary channel and a secondary channel in a frequency band above 45 GHz; during the BRP TXSS, transmit a plurality of BRP frames to the second EDMG STA over the primary channel and the secondary channel according to an EDMG control mode; determine a transmit beamforming configuration over the aggregated channel bandwidth based on BRP feedback from the second EDMG STA; and transmit an EDMG Physical Layer (PHY) Protocol Data Unit (PPDU) to the second EDMG STA over the aggregated channel bandwidth based on the transmit beamforming configuration.

25 Claims, 10 Drawing Sheets

Related U.S. Application Data

(60) Provisional application No. 62/596,619, filed on Dec. 8, 2017, provisional application No. 62/596,622, filed on Dec. 8, 2017.

(51) Int. Cl.
*H04W 72/04* (2009.01)
*H01Q 3/00* (2006.01)

(52) U.S. Cl.
CPC ...... *H04B 7/0695* (2013.01); *H04W 72/0446* (2013.01); *H04W 72/046* (2013.01); *H04W 72/0453* (2013.01)

(56) References Cited

U.S. PATENT DOCUMENTS

| | | |
|---|---|---|
| 2019/0288763 A1* | 9/2019 | Oteri .................... H04B 7/0697 |
| 2021/0007111 A1 | 1/2021 | Da Silva et al. |
| 2021/0007112 A1 | 1/2021 | Da Silva et al. |

OTHER PUBLICATIONS

Notice of Allowance for U.S. Appl. No. 16/194,639, dated Dec. 20, 2019, 12 Pages.

* cited by examiner

APPARATUS, SYSTEM AND METHOD OF BEAMFORMING AND BEAM TRACKING

CROSS REFERENCE

This application claims the benefit of and priority from U.S. Provisional Patent Application No. 62/596,619 entitled "Beam Tracking Using Enhanced Directional Multi-Gigabit Packets", filed Dec. 8, 2017, and U.S. Provisional Patent Application No. 62/596,622 entitled "Beamforming Training For Carrier Aggregation", filed Dec. 8, 2017, the entire disclosures of all of which are incorporated herein by reference.

TECHNICAL FIELD

Embodiments described herein generally relate to beamforming and beam tracking.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
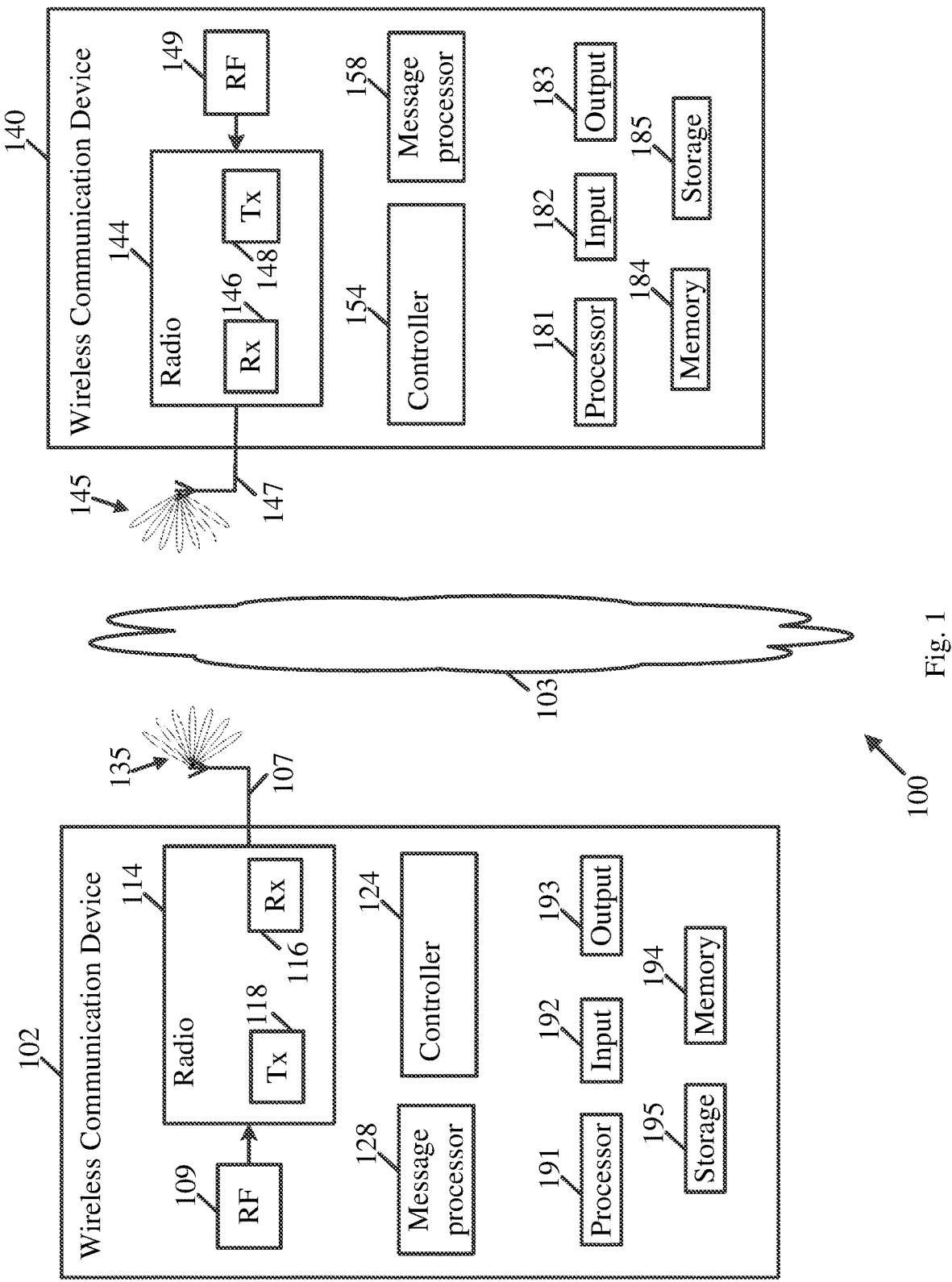
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016

(*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016*); and/or IEEE 802.11ay (*P802.11ay/D2.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications-Amendment 7: Enhanced Throughput for Operation in License-Exempt Bands Above 45 GHz, July 2018*)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April 2011, Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that may be integrated with a computer, or a peripheral that may be attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more *IEEE* 802.11 *Specifications*, e.g., an *IEEE* 802.11-2016 *Specification*, an *IEEE* 802.11*ay Specification*, and/or any other specification and/or protocol.

Some demonstrative embodiments may be implemented, for example, as part of a new standard in an mmWave band, e.g., a 60 GHz frequency band or any other directional band, for example, as an evolution of an *IEEE* 802.11-2016 *Specification* and/or an *IEEE* 802.11*ad Specification*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase the data transmission rates defined in the *IEEE 802.11ad Specification*, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an *IEEE 802.11ay Standard* and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the *IEEE 802.11ad-2012 Specification*, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC)

schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an *IEEE* 802.11-2016 *Standard*, and the like. For example, a non-EDMG station may include a DMG station, which is not an EDMG station.

Figure 2:
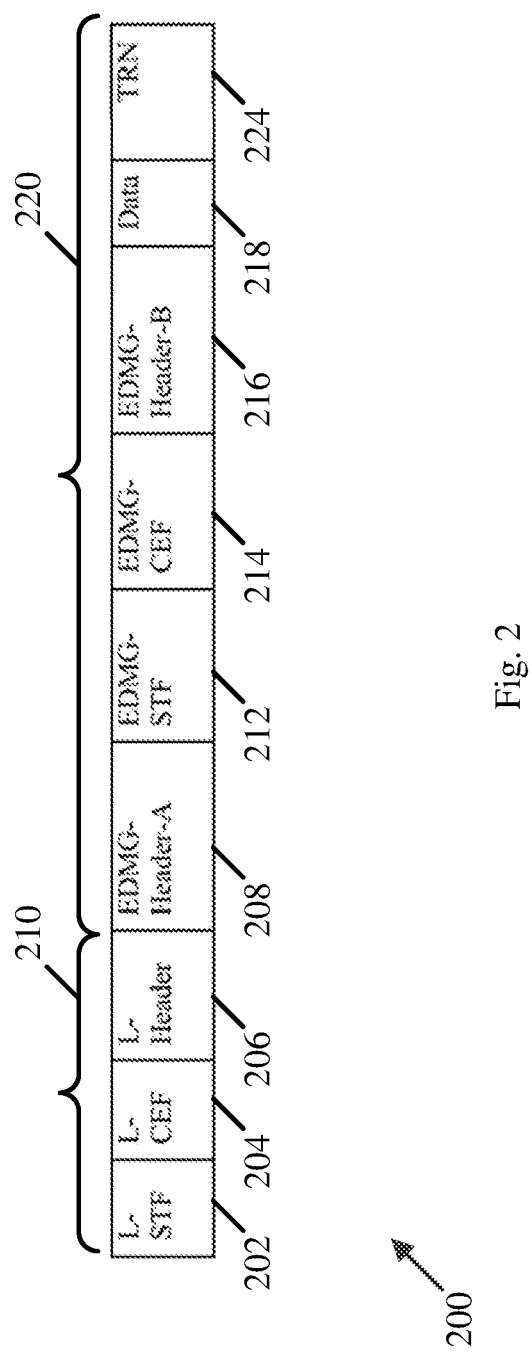
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.48 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a training (TRN) field 224.

In some demonstrative embodiments, EDMG portion 220 may include some or all of the fields shown in FIG. 2 and/or one or more other additional or alternative fields.

Referring back to FIG. 1, in some demonstrative embodiments, devices 102 and/or 140 may be configured to generate, transmit, receive and/or process one or more transmissions, e.g., including one or more EDMG PPDUs, e.g., as described below.

In some demonstrative embodiments, for example, devices 102 and/or 140 may be configured to perform one or more operations, and/or functionalities of an EDMG STA, which may be configured, for example, to generate, transmit, receive and/or process one or more transmissions, e.g., including one or more EDMG PPDUs, e.g., including one or more fields according to the EDMG PPDU format of FIG. 2.

In some demonstrative embodiments, devices 102 and/or 140 may be configured to generate, transmit, receive and/or process one or more transmissions of PPDUs, for example, EDMG PPDUs including Beam Refinement Protocol (BRP) frames, e.g., in accordance with an *IEEE* 802.11*ay Specification* and/or any other specification, e.g., as described below.

In some demonstrative embodiments, devices 102 and/or 140 may be configured to support beamforming training for channel aggregation, for example, for two 2.16 GHz and/or two 4.32 GHz channels, e.g., in accordance with an *IEEE* 802.11 *ay Specification* and/or any other specification, e.g., as described below.

Some demonstrative embodiments may be implemented to support beamforming training for channel aggregation, which may rely, for example, on the transmission of BRP frames in both primary and secondary aggregated channels, e.g., as described below.

Some demonstrative embodiments may be implemented to support the aggregation of two 2.16 GHz and/or 4.32 GHz channels, for example, a 2.16+2.16 GHz channel width, and/or a 4.32+4.32 GHz channel width, e.g., in accordance with an *IEEE* 802.11*ay Specification* and/or any other specification.

In some demonstrative embodiments, an aggregated channel may include a primary channel and a secondary channel, e.g., as described below.

In some demonstrative embodiments, a beamforming training, for example, when channel aggregation is used, may implement a BRP Transmit Sector Sweep (TXSS) procedure, e.g., as described below.

In some demonstrative embodiments, there may be a need to address a technical issue of, for example, establishing communication between two STAs over two aggregated channels, for example, including a primary channel of an aggregated channel bandwidth and a secondary channel of an aggregated channel bandwidth. For example, the two STAs may already have a link established in a primary channel, and may have already determined antenna settings for transmission and/or reception in the primary channel, which may enable communications between the two STAs in the primary channel. For example, after intent to use channel aggregation is indicated and acknowledged using the primary channel, the STAs may perform beamforming training in a secondary channel to determine antenna settings for transmission and/or reception in the secondary channel.

In some demonstrative embodiments, beamforming training may be performed using a BRP TXSS protocol, which may include the transmission of BRP frames by both STAs (initiator and responder of the procedure), e.g., in accordance with an *IEEE* 802.11*ay Specification*. However, when intent to perform channel aggregation is indicated and acknowledged, the STAs may still have not determined antenna settings for the secondary channel.

In some demonstrative embodiments, devices 102 and/or 140 may be configured to perform a beamforming training procedure for aggregated channels, for example, even before establishing communication in the secondary channel, e.g., as described below.

In some demonstrative embodiments, devices 102 and/or 140 may be configured to generate, transmit, receive and/or process one or more transmissions of EDMG PPDUs, for example, EDMG BRP packets, e.g., as described below.

In some demonstrative embodiments, devices 102 and/or 140 may be configured to generate, transmit, receive and/or process one or more transmissions of the EDMG BRP packets, for example, according to a transmission mode, which may be configured to support and/or enable transmission of an EDMG BRP packet over an aggregated channel, for example, in accordance with an *IEEE 802.11ay Specification*, e.g., as described below.

In some demonstrative embodiments, devices 102 and/or 140 may be configured to generate, transmit, receive and/or process one or more transmissions of the EDMG BRP packets sent in a secondary aggregated channel, for example, even before communication between devices 102 and/or 140 is established in the secondary channel, e.g., as described below.

In some demonstrative embodiments, devices 102 and/or 140 may be configured to generate, transmit, receive and/or process BRP frames communicated in the secondary aggregated channel, for example, even before communication between devices 102 and/or 140 is established in the secondary channel, e.g., as described below.

In some demonstrative embodiments, devices 102 and/or 140 may be configured to generate, transmit, receive and/or process BRP frames over a secondary channel of an aggregated channel bandwidth, for example, even before communication between devices 102 and/or 140 is established in the secondary channel, for example, at a control mode rate or higher Modulation and Coding Scheme (MCS), e.g., as described below.

In some demonstrative embodiments, controller 124 may be configured to cause, trigger, and/or control a wireless station implemented by device 102, e.g., a first EDMG STA, to exchange first and second BRP setup frames with a wireless station implemented by device 140, e.g., a second EDMG STA, for example, to initiate a BRP TXSS over an aggregated channel bandwidth including an aggregation of a primary channel and a secondary channel in a frequency band above 45 GHz, e.g., as described below.

In some demonstrative embodiments, controller 124 may be configured to cause, trigger, and/or control the wireless station implemented by device 102 to transmit, for example, during the BRP TXSS, a plurality of BRP frames to device 140 over the primary channel and the secondary channel, for example, according to an EDMG control mode, e.g., as described below.

In some demonstrative embodiments, controller 124 may be configured to cause, trigger, and/or control the wireless station implemented by device 102 to determine a transmit beamforming configuration over the aggregated channel bandwidth, for example, based on BRP feedback from device 140, e.g., as described below.

In some demonstrative embodiments, controller 124 may be configured to cause, trigger, and/or control the wireless station implemented by device 102 to transmit an EDMG PPDU to device 140 over the aggregated channel bandwidth, for example, based on the transmit beamforming configuration, e.g., as described below.

In some demonstrative embodiments, the aggregated channel bandwidth may include a 2.16+2.16 GHz channel bandwidth or a 4.32+4.32 GHz channel bandwidth, e.g., as described below.

In other embodiments, the aggregated channel bandwidth may include any other additional and/or alternative channel bandwidth.

In some demonstrative embodiments, controller 124 may be configured to cause, trigger, and/or control the wireless station implemented by device 102 to transmit the plurality of BRP frames, for example, while using in the secondary channel an Antenna Weight Vector (AWV) setting, which is selected by an implementation, e.g., as described below.

In some demonstrative embodiments, an AWV antenna setting used for the transmission of BRP frames, for example, including preambles, headers, and/or the data field, in the secondary channel may be chosen by the implementation, for example, when beamforming training is performed for the channel aggregation case before communication in the secondary channel has been established. For example, the AWV antenna setting used for the transmission of one or more subfields of BRP packets over the secondary channel may be chosen by the implementation. In one example, the AWV antenna setting used for the transmission of the first P TRN subfields, for example, in each Training Unit (TRN-Unit), that include the TRN field of EDMG BRP-Transmit (BRP-TX) and/or EDMG BRP-Receive (BRP-RX) packets, for example, used in the beamforming training procedure, may be chosen by the implementation.

In some demonstrative embodiments, controller 124 may be configured to cause, trigger, and/or control the wireless station implemented by device 102 to transmit a BRP frame of the plurality of BRP frames, for example, by transmitting a TRN field of the BRP frame, e.g., TRN field 224 (FIG. 2), over the primary channel and the secondary channel, e.g., as described below.

In some demonstrative embodiments, controller 124 may be configured to cause, trigger, and/or control the wireless station implemented by device 102 to set a field in a BRP frame of the plurality of BRP frames to indicate that measurements are to be performed, for example, using a quasi-omni antenna pattern, e.g., as described below.

In some demonstrative embodiments, controller 124 may be configured to cause, trigger, and/or control the wireless station implemented by device 102 to set to "1" a TRN-Unit Receive (Rx) pattern field in an EDMG Header A of the BRP frame, for example, to indicate that measurements are to be performed using the quasi-omni antenna pattern, e.g., as described below.

In other embodiments, any other field and/or indication may be used.

In some demonstrative embodiments, controller 124 may be configured to cause, trigger, and/or control the wireless station implemented by device 102 to transmit the BRP frames over the primary and secondary channels in a non-EDMG duplicate format, e.g., as described below.

In some demonstrative embodiments, a duration of a BRP data field of a BRP frame over the secondary channel may be equal to a duration of the BRP data field over the primary channel, e.g., as described below.

In some demonstrative embodiments, controller 124 may be configured to cause, trigger, and/or control the wireless station implemented by device 102 to configure a TRN field of a BRP frame, e.g., TRN field 224 (FIG. 2), over the secondary channel with a same configuration of the TRN field over the primary channel, e.g., as described below.

In some demonstrative embodiments, controller 124 may be configured to cause, trigger, and/or control the wireless station implemented by device 102 to perform a role, one or more functionalities of, one or more operations of, and/or one or more procedures of, an initiator of the BRP TXSS, e.g., as described below.

In some demonstrative embodiments, the initiator of the BRP TXSS, e.g., device 102, may be configured to transmit the first BRP setup frame, to receive the second BRP setup frame, and to transmit the BRP frames in an initiator BRP TXSS phase, e.g., as described below.

In some demonstrative embodiments, controller 124 may be configured to cause, trigger, and/or control the wireless station implemented by device 102 to perform a role, one or more functionalities of, one or more operations of, and/or one or more procedures of, a responder of the BRP TXSS, e.g., as described below.

In some demonstrative embodiments, the responder of the BRP TXSS, e.g., device 102, may be configured to receive the first BRP setup frame, to transmit the second BRP setup frame, and to transmit the BRP frames in a responder BRP TXSS phase, e.g., as described below.

Figure 3:
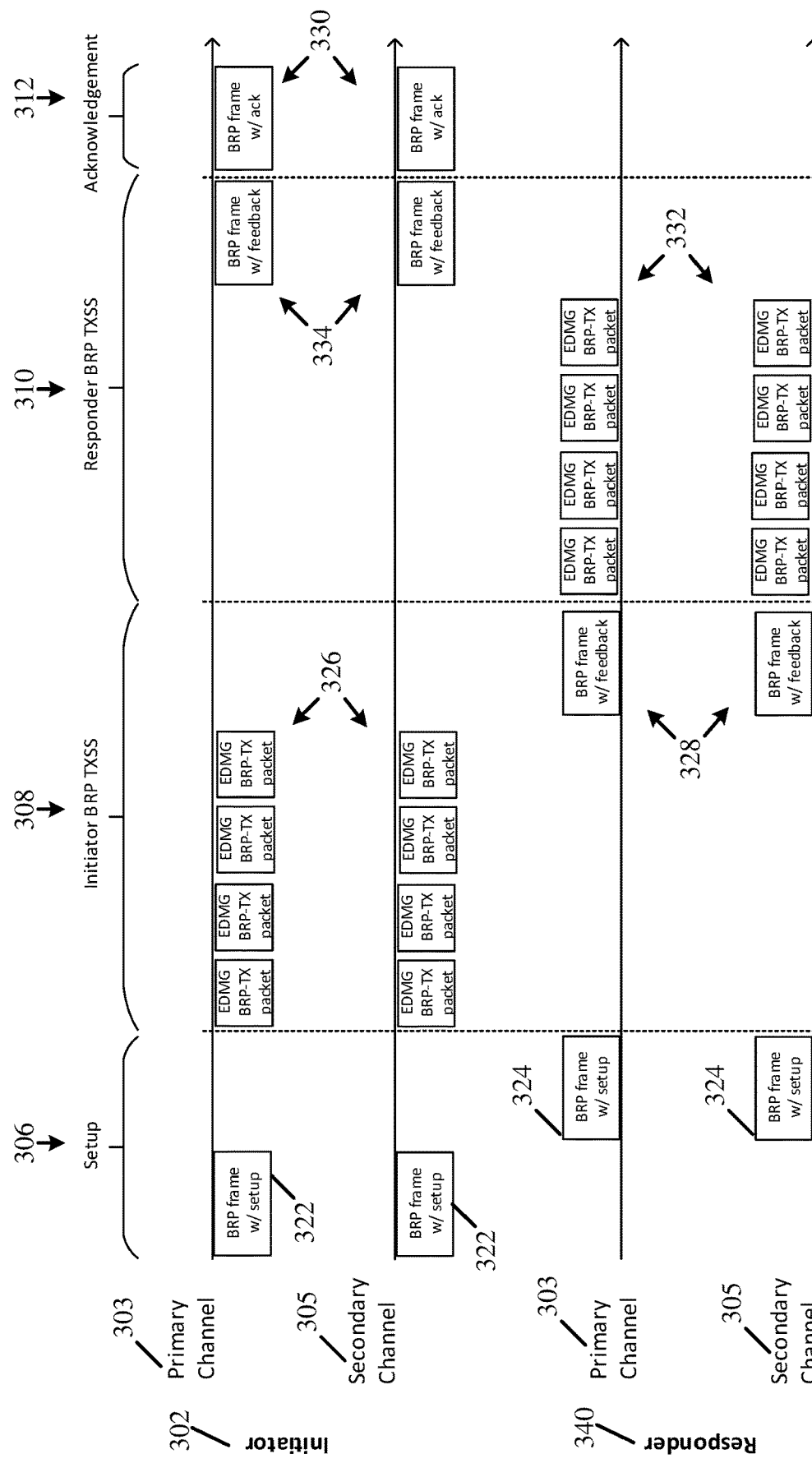
FIG. 3 is a schematic illustration of a Beam Refinement Protocol (BRP) Transmit Sector Sweep (TXSS) protocol, which may be implemented in accordance with some demonstrative embodiments.

Reference is made to FIG. 3, which schematically illustrates a BRP TXSS protocol 300 for a channel aggregation, which may be implemented in accordance with some demonstrative embodiments. In one example, devices 102 (FIG. 1) and/or 140 (FIG. 1) may be configured to generate, transmit, receive and/or process one or more BRP frames according to BRP TXSS protocol 300.

In one example, devices 102 (FIG. 1) and/or 140 (FIG. 1) may communicate BRP frames in accordance with BRP TXSS protocol 300, for example, as part of communication over a primary channel and a secondary channel of an aggregated channel bandwidth, e.g., as described below.

In some demonstrative embodiments, device 102 (FIG. 1) may perform a role, one or more functionalities of, one or more operations of, and/or one or more procedures of, an initiator 302 of BRP TXSS protocol 300.

In some demonstrative embodiments, device 140 (FIG. 1) may perform a role, one or more functionalities of, one or more operations of, and/or one or more procedures of, a responder 340 of BRP TXSS protocol 300.

As shown in FIG. 3, BRP TXSS protocol 300 may include a setup phase 306, during which initiator 302 may exchange first and second BRP setup frames with responder 340, for example, to initiate BRP TXSS protocol 300 over an aggregated channel bandwidth.

For example, as shown in FIG. 3, initiator 302 may transmit to responder 340 a first BRP setup frame 322, which may be duplicated over a primary channel 303 and a secondary channel 305 of the aggregated channel bandwidth. For example, as shown in FIG. 3, responder 340 may transmit to initiator 302 a second BRP setup frame 324, which may be duplicated over primary channel 303 and secondary channel 305 of the aggregated channel bandwidth.

As shown in FIG. 3, BRP TXSS protocol 300 may include an initiator BRP TXSS phase 308, for example, following setup phase 306.

As shown in FIG. 3, during initiator BRP TXSS phase 308, initiator 302 may to transmit to responder 340 a plurality of BRP frames 326 duplicated over primary channel 303 and secondary channel 305.

For example, initiator 302 may transmit to responder 340 BRP frames 326 during initiator BRP TXSS 308, for example, according to an EDMG control mode.

As shown in FIG. 3, initiator 302 may be configured to receive from responder 340 BRP feedback 328 duplicated over primary channel 303 and secondary channel 305, for example, during initiator BRP TXSS phase 308. For example, BRP feedback 328 may be based on measurements performed at responder 340 based on the BRP frames 326.

In some demonstrative embodiments, initiator 302 may be configured to determine a transmit beamforming configuration over the aggregated channel bandwidth, for example, based on BRP feedback 328 from responder 340.

In some demonstrative embodiments, initiator 302 may be configured to transmit an EDMG PPDU to responder 340 over the aggregated channel bandwidth, for example, based on the transmit beamforming configuration.

As shown in FIG. 3, BRP TXSS protocol 300 may include an acknowledgement stage 312, during which initiator 302 may transmit to responder 340 a BRP acknowledgement frame 330.

As shown in FIG. 3, BRP TXSS protocol 300 may include a responder BRP TXSS phase 310, for example, following initiator BRP TXSS phase 308.

As shown in FIG. 3, during responder BRP TXSS phase 310, responder 340 may transmit to initiator 302 a plurality of BRP frames 332 duplicated over primary channel 303 and secondary channel 305.

For example, responder 340 may transmit to initiator 302 BRP frames 332 during responder BRP TXSS 310, for example, according to an EDMG control mode.

As shown in FIG. 3, responder 340 may be configured to receive from initiator 302 BRP feedback 334 duplicated over primary channel 303 and secondary channel 305, for example, during responder BRP TXSS phase 310. For example, BRP feedback 334 may be based on measurements performed at initiator 302 based on the BRP frames 332.

In some demonstrative embodiments, responder 340 may be configured to determine a transmit beamforming configuration over the aggregated channel bandwidth, for example, based on BRP feedback 334 from initiator 302.

In some demonstrative embodiments, responder 340 may be configured to transmit an EDMG PPDU to initiator 302 over the aggregated channel bandwidth, for example, based on the transmit beamforming configuration.

In some demonstrative embodiments, devices 102 (FIG. 1) and/or 140 (FIG. 1) may communicate EDMG BRP packets, for example, in accordance with BRP TXSS protocol 300. For example, the EDMG BRP packets may include BRP frames with an attached TRN field, e.g., TRN field 224 (FIG. 2).

In some demonstrative embodiments, devices 102 (FIG. 1) and/or 140 (FIG. 1) may communicate the EDMG BRP packets, e.g., BRP packets 326 and/or BRP packets 332, to perform beamforming training over the primary channel and the secondary channel of the aggregated channel bandwidth. For example, a receiver STA of the EDMG BRP packets, e.g., responder 340 receiving BRP frames 326 and/or initiator 302 receiving BRP frames 332, may use the EDMG BRP packets, e.g., BRP frames that have a TRN field attached to them, to perform a beamforming training, for example, even though the sector/AWV used in the transmission of BRP frames in the secondary channel have not been determined yet. For example, the receiver STA may determine the timing of a signal in the secondary channel based on the reception of the signal in the primary channel, e.g., as described below.

Figure 4:
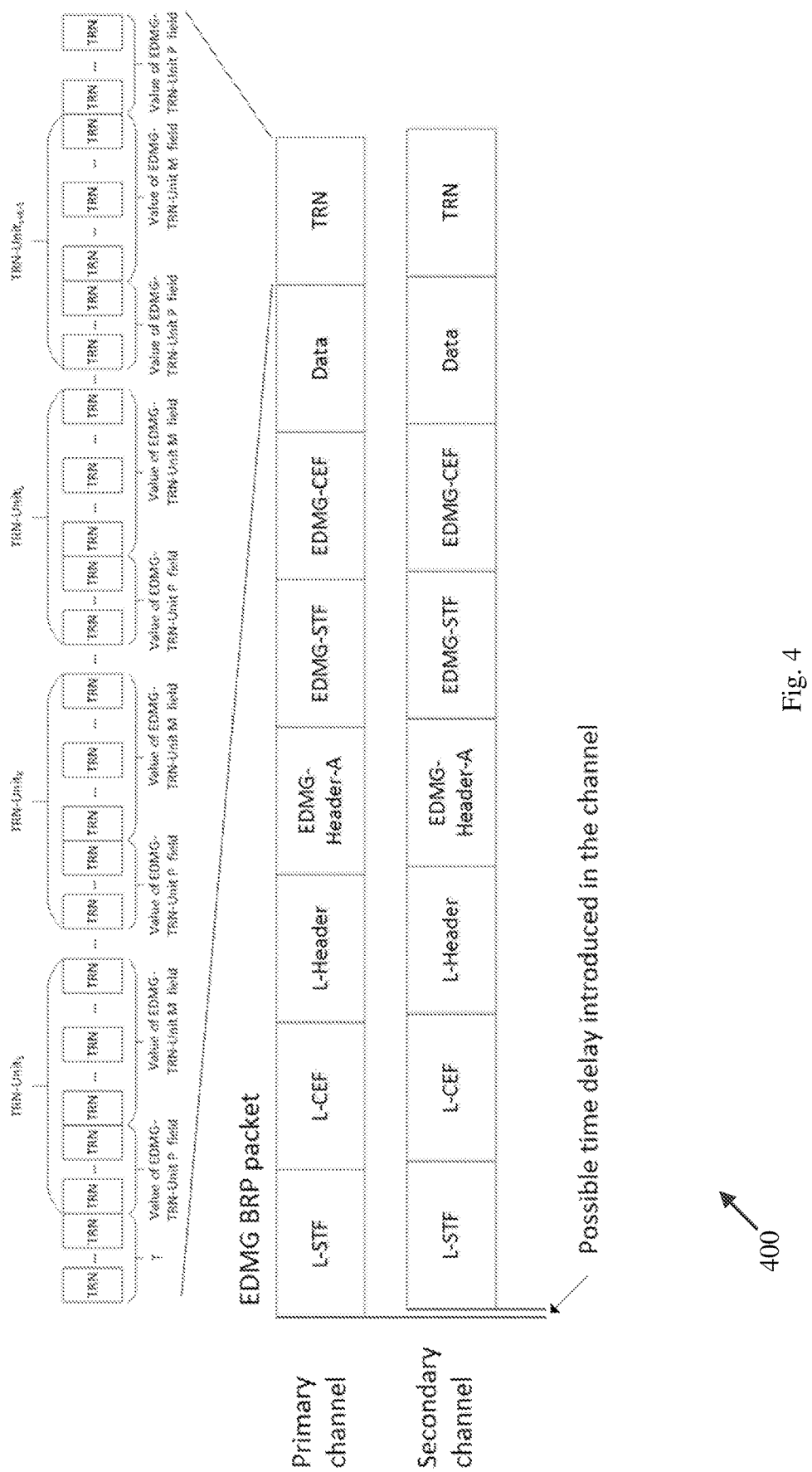
FIG. 4 is a schematic illustration of an EDMG BRP packet transmission over a primary channel and a secondary channel of an aggregated channel bandwidth, which may be implemented in accordance with some demonstrative embodiments.

Reference is made to FIG. 4, which schematically illustrates an EDMG BRP packet transmission 400, which may be implemented in accordance with some demonstrative embodiments. In one example, devices 102 (FIG. 1) and/or 140 (FIG. 1) may be configured to generate, transmit, receive and/or process one or more EDMG BRP packets according to EDMG BRP packet transmission 400.

In one example, EDMG BRP packet transmission 400 may include a duplicated transmission of a BRP frame 326 (FIG. 3) over a primary channel and a secondary channel of an aggregated channel bandwidth. In another example, EDMG BRP packet transmission 400 may include a duplicated transmission of a BRP frame 332 (FIG. 3) over the primary channel and the secondary channel of the aggregated channel bandwidth.

In some demonstrative embodiments, a receiver STA of EDMG BRP packet transmission 400, e.g., responder 340 receiving BRP frames 326 and/or initiator 302 receiving BRP frames 332, may receive EDMG BRP packet transmission 400, for example, over both the primary channel and the secondary channel of the aggregated channel bandwidth.

As shown in FIG. 4, the receiver STA may be able to determine timing of the signal in the secondary channel, for example, as signals transmitted in aggregated channels may have substantially no time delay between them.

In one example, time delays introduced in the channel are expected to be relatively short, for example, less than the guard interval, and have no significant impact in Signal-to-Noise Ratio (SNR) measurements. Accordingly, the receiver STA may be configured to determine with good accuracy the start of the TRN field, e.g., TRN field 224 (FIG. 2), in the EDMG BRP packet 400 transmitted in the secondary channel, for example, based on the reception of the corresponding frame in the primary channel, and the receiver STA may use the TRN field to perform measurements.

In some demonstrative embodiments, a beamforming training procedure for aggregated channels, for example, including communication of EDMG BRP packet transmission 400, which may be suitable, for example, for implementing even before communication in the secondary channel has been established, may be configured according to one or more of the following requirements:

The duration of the data field of EDMG BRP packets transmitted simultaneously in a primary channel and a secondary channel shall be the same. For example, simultaneous transmission may include, for example, no time delay or possibly a time delay that is defined in an *IEEE* 802.11*ay Specification* and/or any other specification. The delay could be defined, for example, in terms of a fixed value or in a range of values, with the actual value used possibly chosen by the implementation.

The configuration of the TRN field of EDMG BRP packets transmitted simultaneously in a primary channel and a secondary channel shall be the same. Specifically, the values of the fields EDMG TRN Length, RX TRN-Units per Each TX TRN-Unit, EDMG TRN-Unit P, EDMG TRN-Unit M and/or EDMG TRN-Unit N in the EDMG-Header-A of both EDMG BRP frames shall be the same.

In other embodiments, a beamforming training procedure for aggregated channels before communication in the secondary channel has been established may be configured according to any other additional and/or alternative requirements.

In some demonstrative embodiments, EDMG STAs, e.g., devices 102 and/or 140 (FIG. 1), may be configured to implement a beamforming training procedure for aggregated channels according to one or more of the requirements of duration of a data field of EDMG BRP packets, and/or requirements for a configuration of the TRN field of EDMG BRP packets, e.g., as described above.

In some demonstrative embodiments, the EDMG STAs, e.g., devices 102 and/or 140 (FIG. 1), may be configured to communicate EDMG BRP packets, for example, according to a protocol, which may restrict the transmission of BRP frames in a BRP TXSS performed over two aggregated channels, e.g., the transmission of BRP frames 326 (FIG. 3) in initiator BRP TXSS 308 (FIG. 3) and/or the transmission of BRP frames 332 (FIG. 3) in responder BRP TXSS 310 (FIG. 3), before communication in the secondary channel has been established, to be made by using the EDMG Control Mode in the non-EDMG duplicate format, for example, in accordance with an *IEEE* 802.11*ay Specification*.

In some demonstrative embodiments, the EDMG STAs, e.g., devices 102 and/or 140 (FIG. 1), may be configured to implement a beamforming training procedure for aggregated channels, e.g., before communication in the secondary channel has been established, for example, according to one or more of the following requirements:

The TRN-Unit RX Pattern field in the EDMG-Header-A of EDMG BRP-TX packets, e.g., EDMG Header A 208 (FIG. 2), shall be set to "1", for example, to indicate that measurements shall be performed using a quasi-omni antenna pattern.

Measurements on the same frames are to be reported in BRP frames transmitted simultaneously in a primary channel and a secondary channel. Alternatively, BRP frames used to feedback measurements shall be transmitted in the primary channel only.

The data field of BRP frames used to setup the BRP procedure that are transmitted simultaneously in a primary channel and a secondary channel shall be the same. Alternatively, BRP frames used to setup a BRP procedure in this case shall be transmitted in the primary channel only.

In other embodiments, any other additional or alternative requirements may be implemented to support a beamforming training procedure for aggregated channels before communication in the secondary channel has been established.

Referring back to FIG. 1, in some demonstrative embodiments, devices 102 and/or 140 may be configured to support and/or implement one or more operations of setting up on a first channel a Sector-Level Sweep (SLS) procedure over a second channel, e.g., as described below.

In some demonstrative embodiments, devices 102 and/or 140 may be configured to define an SLS procedure for channel aggregation. For example, SLS may not require that a link has already been established, and/or may not assume that the timing of BRP frames transmitted in a channel, for example, a secondary channel of an aggregated channel bandwidth, can be inferred from signals transmitted in a different channel, for example, a primary channel of the aggregated channel bandwidth, e.g., as described below.

In some demonstrative embodiments, the SLS procedure may be implemented to support beamforming training in the secondary channel of the aggregated channel bandwidth, for example, even before a link in the secondary channel is established, e.g., as described below.

In some demonstrative embodiments, controller 124 may be configured to cause, trigger, and/or control the wireless station implemented by device 102 to exchange an SLS request and an SLS response with device 140 over a first channel in a frequency band above 45 GHz, e.g., as described below.

In some demonstrative embodiments, the SLS request may include channel information to identify a second channel in the frequency band above 45 GHz, and the SLS response may include an indication whether the SLS request is confirmed, e.g., as described below.

In some demonstrative embodiments, controller 124 may be configured to cause, trigger, and/or control the wireless station implemented by device 102 to perform an Initiator Sector Sweep (ISS) of the SLS with device 140 over the second channel, for example, when the SLS request is confirmed, e.g., as described below.

In some demonstrative embodiments, the first channel may include a primary channel of an aggregated channel bandwidth and the second channel may include a secondary channel of the aggregated channel bandwidth, e.g., as described above.

In some demonstrative embodiments, the aggregated channel bandwidth may include a 2.16+2.16 GHz channel bandwidth or a 4.32+4.32 GHz channel bandwidth, e.g., as described below.

In other embodiments, the first channel and the second channel may include any other channels of any other channel bandwidth.

In some demonstrative embodiments, controller 124 may be configured to cause, trigger, and/or control the wireless station implemented by device 102 to setup an SLS with device 140 over a secondary channel of an aggregated channel bandwidth, for example, by exchanging with device 140 an SLS request frame and an SLS response frame over a primary channel of the aggregated channel bandwidth, e.g., as described below.

In some demonstrative embodiments, the SLS request may include channel information to identify the secondary channel, and the SLS response may include an indication whether the SLS request is confirmed, e.g., as described below.

In some demonstrative embodiments, the SLS request may include a grant frame and the SLS response may include a grant Acknowledgement (Ack) frame, e.g., as described below.

In other embodiments, the SLS request and/or the SLS response may include any other type of frame.

In some demonstrative embodiments, a control trailer of the grant frame may include a channel number of the secondary channel, e.g. as described below.

In some demonstrative embodiments, a control trailer of the grant Ack frame may include the channel number of the secondary channel, for example, when the SLS request is confirmed, e.g., as described below.

In some demonstrative embodiments, the SLS request may include a timeout value, for example, to indicate a timeout of the SLS request relative to a time indicated by a duration field of the grant frame, e.g., as described below.

In some demonstrative embodiments, controller 124 may be configured to cause, trigger, and/or control the wireless station implemented by device 102 to perform a role of an initiator of the SLS; and/or controller 154 may be configured to cause, trigger, and/or control the wireless station implemented by device 140 to perform a role of a responder of the SLS, e.g., as described below.

In other embodiments, controller 124 may be configured to cause, trigger, and/or control the wireless station implemented by device 102 to perform a role of a responder of the SLS; and/or controller 154 may be configured to cause, trigger, and/or control the wireless station implemented by device 140 to perform a role of an initiator of the SLS.

In some demonstrative embodiments, the initiator of the SLS, e.g., device 102, may be configured to transmit the SLS request over the primary channel, to receive the SLS response over the primary channel, and to transmit during the ISS one or more Sector Sweep (SSW) frames or short-SSW frames over the secondary channel to a device performing a role of the responder of the SLS, for example, device 140, e.g., as described below.

In some demonstrative embodiments, the responder of the SLS, e.g., device 140, may be configured to receive the SLS request over the primary channel, to transmit the SLS response over the primary channel, and to receive during the ISS one or more SSW frames or short-SSW frames over the secondary channel from a device performing a role of the initiator, for example, device 102, e.g., as described below.

Figure 5:
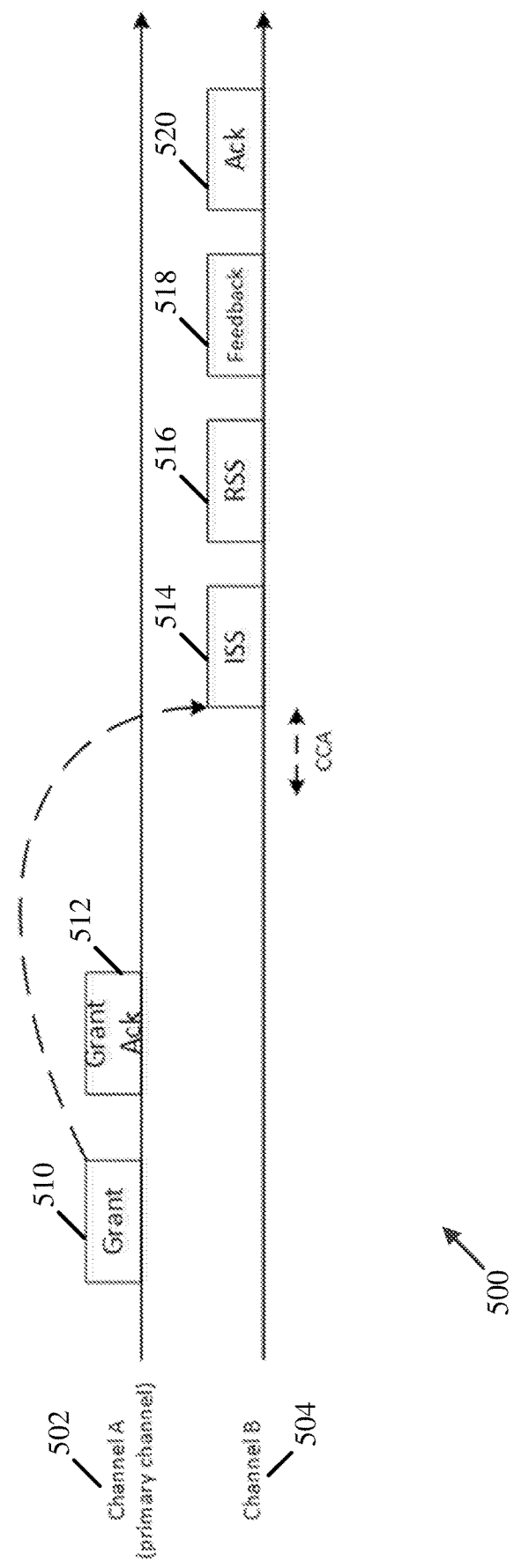
FIG. 5 is a schematic illustration of a Sector Level Sweep (SLS) protocol, in accordance with some demonstrative embodiments.

Reference is made to FIG. 5, which schematically illustrates an SLS protocol 500, which may be implemented in accordance with some demonstrative embodiments. In one example, devices 102 (FIG. 1) and/or 140 (FIG. 1) may be configured to perform an SLS procedure for channel aggregation in accordance with SLS protocol 500.

For example, SLS protocol 500 may be configured to support channel aggregation, which may allow performing beamforming training in the secondary channel, for example, even before a link is established in the secondary channel.

In some demonstrative embodiments, device 102 (FIG. 1) may operate as, perform the role of, and/or perform one or more functionalities of, an initiator of SLS protocol 500, and/or device 140 (FIG. 1) may operate as, perform the role of, and/or perform one or more functionalities of, a responder of SLS protocol 500.

In other embodiments, device 140 (FIG. 1) may operate as, perform the role of, and/or perform one or more functionalities of, the initiator of SLS protocol 500, and device 102 (FIG. 1) may operate as, perform the role of, and/or perform one or more functionalities of, the responder of SLS protocol 500.

As shown in FIG. 5, the initiator of SLS protocol 500, e.g., device 102 (FIG. 1), may send an SLS request 510 to the responder, e.g., device 140 (FIG. 1), in a first channel 502, denoted channel A. For example, first channel 502 may include a primary channel of an aggregated channel bandwidth.

For example, SLS request 510 may be in the form of a Grant frame appended with a control trailer that includes an allocation in a second channel 504, denoted channel B, along with some additional information that will be used for the upcoming SLS performed in second channel 504. For example, second channel 504 may include a secondary channel of the aggregated channel bandwidth.

In some demonstrative embodiments, Grant frame 510 may be transmitted in first channel 502, but in the control trailer appended to Grant frame 510, the channel number of second channel 504 may be included so that the responder, e.g., device 140 (FIG. 1), knows the initiator, e.g., device 102 (FIG. 1), is requesting to start an SLS with the responder in the second channel 504.

In some demonstrative embodiments, the initiator, e.g., device 102 (FIG. 1), may include a timeout value, denoted T, in the control trailer appended to Grant frame 510. For example, if neither the initiator nor the responder can communicate with each other on second channel 504 for a time T starting with time D, where D is the value of the Duration field in Grant frame 510, then the initiator and responder may consider the attempt unsuccessful and return to first channel 502.

In some demonstrative embodiments, the responder, e.g., device 140 (FIG. 1), may transmit an acknowledgement frame 512, which may be in the form of a Grant ACK appended with a control trailer.

In some demonstrative embodiments, the initiator, e.g., device 102 (FIG. 1), may start an Initiator Sector Sweep (ISS) 514 in second channel 504, for example, after a pre-defined interval following the transmission of Grant ACK 512. For example, ISS 514 may include an Initiator TXSS, and may make use of either multiple SSW frames or multiple Short SSW frames. For example, ISS 514 may include and/or support one or more procedures and/or operations in accordance with the *IEEE* 802.11-2016 *Standard*, and/or an *IEEE* 802.11*ay Specification*.

In some demonstrative embodiments, a channel number for second channel 504 may be included, for example, in the appended control trailer of Grant Ack frame 512 from the responder.

In one example, the initiator of SLS protocol 500 may determine that the SLS request in second channel 504 may be confirmed by the responder, and the initiator may start the SLS in second channel 504, for example, if the channel number in the appended control trailer of Grant Ack frame 512 from the responder is equal to the channel number of second channel 504 previously contained in the control trailer appended to Grant frame 510 from the initiator.

In one example, the initiator shall consider an unsuccessful agreement on the SLS and shall not start the SLS in second channel 504, for example, if the channel number in the appended control trailer of Grant Ack frame 512 transmitted by the responder is different from the channel number of second channel 504 previously contained in the control trailer appended to Grant frame 510 from the initiator.

In some demonstrative embodiments, the responder may start a Responder Sector Sweep (RSS) 516 in second channel 504, for example, after a pre-defined interval following the transmission of the last packet transmitted by the initiator in ISS 514. For example, RSS 516 may include a Responder TXSS and may make use of either multiple SSW frames or multiple Short SSW frames. For example, RSS 516 may include one or more procedures and/or operations in accordance with the *IEEE* 802.11-2016 *Standard*, and/or an *IEEE* 802.11*ay Specification*.

In some demonstrative embodiments, the initiator shall transmit an SSW-Feedback frame 518 to the responder in second channel 504, for example, after a pre-defined interval following the transmission of the last packet transmitted by the responder in RSS 516. For example, the feedback procedure may include one or more procedures and/or operations in accordance with the *IEEE* 802.11-2016 *Standard*, and/or an *IEEE* 802.11*ay Specification*.

In some demonstrative embodiments, the responder shall transmit an SSW-ACK frame 520 to the initiator in second channel 504 to perform an SSW ACK procedure, for example, after a pre-defined interval following the transmission of SSW-Feedback frame 518. For example, the SSW ACK procedure may include one or more procedures and/or operations in accordance with the *IEEE* 802.11-2016 *Standard*, and/or an *IEEE* 802.11*ay Specification*.

Referring back to FIG. 1, in some demonstrative embodiments, devices 102 and/or 140 may be configured to generate, transmit, receive and/or process one or more different types of EDMG BRP packets, e.g., as described below.

In some demonstrative embodiments, devices 102 and/or 140 may be configured to generate, transmit, receive and/or process one or more of the following three types of EDMG BRP packets:
  EDMG BRP-RX for receive training and tracking;
  EDMG BRP-TX for transmit training and tracking; and/or
  EDMG BRP-RX/TX for simultaneous receive and transmit training and tracking.

In some demonstrative embodiments, devices 102 and/or 140 may be configured to perform one or more operations of transmit beam tracking and/or receive beam tracking procedures, for example, in accordance with an *IEEE* 802.11*ay Specification* and/or any other Specification.

In some demonstrative embodiments, devices 102 and/or 140 may be configured to generate, transmit, receive and/or process one or more transmissions of the EDMG BRP-RX/TX packets, for example, to support a simultaneous receive and transmit tracking procedure, e.g., as described below.

In some demonstrative embodiments, devices 102 and/or 140 may be configured to implement one or more procedures, as well as their required signaling, to enable simultaneous receive and transmit tracking, for example, using EDMG BRP-RX/TX packets, e.g., as described below.

In some demonstrative embodiments, device 102 may operate as, perform the role of, and/or perform one or more functionalities of, an initiator EDMG STA of a beamforming procedure, and/or device 140 may operate as, perform the role of, and/or perform one or more functionalities of, a responder EDMG STA of the beamforming procedure.

In other embodiments, device 140 may operate as, perform the role of, and/or perform one or more functionalities of, the initiator EDMG STA, and/or device 102 may operate as, perform the role of, and/or perform one or more functionalities of, the responder EDMG STA.

For example, in accordance with an *IEEE* 802.11*ay Specification*, an initiator EDMG STA, e.g., device 102, may send a request for transmit beam tracking to a responder EDMG STA, e.g., device 140, for example, by setting one or more of the following fields in a transmitted packet:
  The "Packet Type" field in the L-Header equal to 1 and the "RX TRN-Units per Each TX TRN-Unit" field in the EDMG-Header-A equal to 0 (to indicate the transmission of an EDMG BRP-TX packet);
  The "Beam Tracking Request" field in the L-Header equal to 0 and the "EDMG Beam Tracking Request" field in the EDMG-Header-A equal to 1 (to indicate a request for beam tracking); and
  The "EDMG TRN Length" in the EDMG-Header-A equal to the number of appended TRN-Units to the packet, which shall be greater than zero.

For example, a beam tracking responder, e.g., device 140, may perform measurements, for example, using the received EDMG BRP-TX packet, and may send feedback to the beam tracking initiator, e.g., device 102.

For example, in accordance with an *IEEE* 802.11*ay Specification*, an initiator EDMG STA, e.g., device 102, may send a request for receive beam tracking to a responder EDMG STA, e.g., device 140, for example, by setting one or more of the following fields in a transmitted packet:
  The "Packet Type" field in the L-Header equal to 0 and the "RX TRN-Units per Each TX TRN-Unit" field in the EDMG-Header-A equal to 0 (which, together with the configuration below, indicates a request for the transmission of an EDMG BRP-RX packet);
  The "Beam Tracking Request" field in the L-Header equal to 0 and the "EDMG Beam Tracking Request" field in the EDMG-Header-A equal to 1 (to indicate a request for beam tracking); and
  The "EDMG TRN Length" in the EDMG-Header-A equal to the number of requested TRN-Units, which shall be greater than zero.

For example, the beam tracking responder, e.g., device 140, may send an EDMG BRP-RX packet to the beam tracking initiator, e.g., device 102, for example, with the number of TRN-Units requested by the beam tracking initiator appended to the packet.

Some demonstrative embodiments may be configured to utilize a third beam tracking procedure (also referred to as "unsolicited receive beam tracking"), for example, in accordance with an *IEEE* 802.11*ay Specification* and/or any other Specification.

For example, according to an unsolicited receive beam tracking procedure, an initiator EDMG STA, e.g., device 102, may send an EDMG BRP-RX packet to a responder EDMG STA, e.g., device 140, for example, with no prior request by the responder EDMG STA, that the responder EDMG STA may use to perform receive beam tracking. For example, a beam tracking initiator, e.g., device 102, may transmit the EDMG BRP-RX packet, e.g., using one or more of the following settings:

The "Packet Type" field in the L-Header is equal to 0 and the "RX TRN-Units per Each TX TRN-Unit" field in the EDMG-Header-A is equal to 0 (which, together with the configuration below, indicates an EDMG BRP-RX packet);

The "Beam Tracking Request" field in the L-Header is equal to 0 and the "EDMG Beam Tracking Request" field in the EDMG-Header-A is equal to 0 (which, together with the configuration above, indicates an EDMG BRP-RX packet); and The "EDMG TRN Length" in the EDMG-Header-A is equal to the number of TRN-Units appended to the packet, which shall be greater than zero.

In some demonstrative embodiments, devices 102 and/or 140 may be configured to support and/or implement beam tracking procedures, which use EDMG BRP-RX and/or EDMG BRP-TX packets, and allow for either receive beam tracking or transmit beam tracking.

In some demonstrative embodiments, devices 102 and/or 140 may be configured to use an EDMG BRP-RX/TX packet, for example, for simultaneous receive and transmit beam tracking, e.g., in accordance with an *IEEE* 802.11*ay Specification* and/or any other Specification, e.g., as described below.

In some demonstrative embodiments, there may be a need to provide a definition of how EDMG BRP-RX/TX packets can be used for beam tracking, for example, in a way, which may be unambiguous and/or complete.

For example, it may not be complete to define that "a beam tracking initiator may use procedures specified in an *IEEE* 802.11*ay Specification* to request a beam tracking responder to perform both transmit and receive beam tracking on the same packet. This is done by, on top of the corresponding TXVECTOR parameter configuration specified in an *IEEE* 802.11*ay Specification*, setting the TXVECTOR parameter RX_TRN_PER_TX_TRN to a value greater than zero and the Packet Type to TRN-T-PACKET. In this case, the beam tracking initiator and beam tracking responder shall use the rules described in 30.9.2.2 of an *IEEE* 802.11*ay Specification* to perform both transmit and receive training over the TRN subfields appended to the transmitted packet".

In some demonstrative embodiments, devices 102 and/or 140 may be configured to implement one or more operations to support and/or enable one or more receive and/or transmit beam tracking procedures, which may make more efficient use of EDMG BRP-RX/TX packets and/or enable simultaneous receive and transmit tracking, for example, in accordance with an *IEEE* 802.11*ay Specification*, e.g., as described below.

In some demonstrative embodiments, devices 102 and/or 140 may be configured to generate, transmit, receive and/or process one or more transmissions of the EDMG BRP-RX/TX packets, for example, according to a transmission mode, which may be configured to support and/or enable simultaneous receive and transmit tracking, e.g., as described below.

In some demonstrative embodiments, controller 124 may be configured to cause, trigger, and/or control the wireless station implemented by device 102 to communicate with the wireless station implemented by device 140 a packet, which is from a beam tracking initiator to a beam tracking responder, and includes a request for receive beam tracking, e.g., as described below.

In some demonstrative embodiments, controller 124 may be configured to cause, trigger, and/or control the wireless station implemented by device 102 to communicate with device 140 an EDMG BRP-RX/TX packet, which is from the beam tracking responder to the beam tracking initiator, e.g., as described below.

In some demonstrative embodiments, controller 124 may be configured to cause, trigger, and/or control the wireless station implemented by device 102 to communicate with device 140 a beam tracking feedback, which is from the beam tracking initiator to the beam tracking responder, e.g., as described below.

In some demonstrative embodiments, the beam tracking feedback may include transmit tracking measurements, for example, performed by the beam tracking initiator on the EDMG BRP-RX/TX packet from the beam tracking responder, e.g., as described below.

In some demonstrative embodiments, device 102 may be configured to perform a role, one or more functionalities of, one or more operations of, and/or one or more procedures of, the beam tracking initiator, and/or device 140 may be configured to perform a role, one or more functionalities of, one or more operations of, and/or one or more procedures of, the beam tracking responder, e.g., as described below.

In some demonstrative embodiments, controller 124 may be configured to cause, trigger, and/or control the wireless station implemented by device 102 to perform a role of the beam tracking initiator, to transmit the packet from the beam tracking initiator to device 140, to receive the EDMG BRP-RX/TX packet from device 140, and to transmit the beam tracking feedback to device 140, e.g., as described below.

In some demonstrative embodiments, controller 124 may be configured to allow device 102 to perform receive beam tracking measurements on the EDMG BRP-RX/TX packet, e.g., as described below.

In some demonstrative embodiments, controller 154 may be configured to cause, trigger, and/or control the wireless station implemented by device 140 to perform a role of the beam tracking responder, to receive the packet from the beam tracking initiator, e.g., device 102, to transmit the EDMG BRP-RX/TX packet to device 102, and to receive the beam tracking feedback from device 102, e.g., as described below.

In some demonstrative embodiments, the packet from the beam tracking initiator may include an EDMG Header A field, e.g., EDMG Header A field 208 (FIG. 2), including an "EDMG TRN length" field having a value equal to a number of requested TRN-Units, which is greater than zero; and/or the EDMG Header A field of the EDMG BRP-RX/TX packet may include an "RX Training (TRN) Units per each TX TRN-Unit" field having a value equal to the value of the EDMG TRN length field, e.g., as described below.

In some demonstrative embodiments, the packet from the beam tracking initiator may include a non-EDMG header (L-header), e.g., L-header 206 (FIG. 2), including a "packet type" field equal to "0" and a "beam tracking request field" equal to "0"; the EDMG Header A field of the packet from the beam tracking initiator includes an "EDMG beam tracking request" field equal to "1"; and/or an "RX TRN-Units per each TX TRN-Unit" field in the EDMG Header A field of the packet from the beam tracking initiator may be equal to "0", e.g., as described below.

In some demonstrative embodiments, a packet including the beam tracking feedback may include a feedback type field having a same value of a feedback type field in a last BRP frame from the beam tracking responder to the beam tracking initiator with a TX-TRN Request (TX-TRN-REQ) field equal to "1", e.g., as described below.

In some demonstrative embodiments, devices 102 and/or 140 may be configured to implement one or more operations to support and/or enable one or more procedures of simultaneous receive and transmit beam tracking, e.g., as follows:

1. A beam tracking initiator requests a receive beam tracking.
2. The beam tracking responder, instead of sending an EDMG BRP-RX packet as defined in the receive beam tracking procedure, sends instead an EDMG BRP-RX/TX packet. By doing so, the beam tracking initiator
    a) May perform receive beam tracking as requested; and
    b) Shall perform transmit tracking measurements using the different transmit AWVs used by the beam tracking responder in the transmission of the EDMG BRP-RX/TX packet.
3. The beam tracking initiator then sends feedback to the beam tracking responder based on the transmit tracking measurements it made on the EDMG BRP-RX/TX packet sent by the beam tracking responder.

In some demonstrative embodiments, devices 102 and/or 140 may be configured to implement the simultaneous receive and transmit beam tracking procedure, e.g., using one or more of the following operations:

1. An EDMG STA (initiator) requests receive beam tracking to a peer EDMG STA (responder) by setting the following fields in a transmitted packet:
    a) The "Packet Type" field in the L-Header equal to 0 and the "RX TRN-Units per Each TX TRN-Unit" field in the EDMG-Header-A equal to 0;
    b) The "Beam Tracking Request" field in the L-Header equal to 0 and the "EDMG Beam Tracking Request" field in the EDMG-Header-A equal to 1; and
    c) The "EDMG TRN Length" in the EDMG-Header-A equal to the number of requested TRN-Units, which shall be greater than zero.
2. The beam tracking responder may:
    a) Send an EDMG BRP-RX packet to the beam tracking initiator with the number of TRN-Units requested by the beam tracking initiator. This may correspond to a receive beam tracking procedure.
    b) Send an EDMG BRP-RX/TX packet to the beam tracking initiator. In this case:
        i. The value in the "RX TRN-Units per Each TX TRN-Unit" field in the EDMG-Header-A of the EDMG BRP-RX/TX packet sent by the beam tracking responder shall be equal to the value in the "EDMG TRN Length" field in the EDMG-Header-A of the BRP frame sent by the beam tracking initiator to start the process.
        ii. The value of the "EDMG Beam Tracking Request" field in the EDMG-Header-A of the EDMG BRP-RX/TX packet sent by the beam tracking responder may be equal to 0 or 1.
        iii. The value of the "Beam Tracking Request" field in the L-Header of the EDMG BRP-RX/TX packet sent by the beam tracking responder may be equal to 0 or 1.
3. The beam tracking initiator then sends feedback to the beam tracking responder, for example, based on the transmit tracking measurements it made on the EDMG BRP-RX/TX packet from the beam tracking responder.

a) The beam tracking initiator may append the feedback to any packet from the initiator to the responder.
    b) The feedback type shall be the same as the feedback type in the last BRP frame that was transmitted from the responder to the initiator with TX-TRN-REQ equal to 1. If the initiator has never received a BRP frame from the responder with TX-TRN-REQ equal to 1, the initiator shall respond with all subfields of the FBCK-TYPE field equal to 0 and set the BS-FBCK field to the AWV feedback ID corresponding to the TRN subfields transmitted with the same AWV that were received with the best quality.

In some demonstrative embodiments, devices 102 and/or 140 may be configured to implement and/or support simultaneous receive and transmit beam tracking according to a procedure including some or all of the operations of the simultaneous receive and transmit beam tracking procedure described above and/or one or more additional or alternative operations, parameters, and/or procedures.

In some demonstrative embodiments, devices 102 and/or 140 may be configured to implement one or more operations to support and/or enable one or more receive and transmit beam tracking procedures, which may make use of EDMG BRP-RX/TX packets and enable transmit beam tracking and unsolicited receive beam tracking, for example, in accordance with an *IEEE 802.11ay Specification*, e.g., as described below.

In some demonstrative embodiments, controller 124 may be configured to cause, trigger, and/or control the wireless station implemented by device 102 to communicate with the wireless station implemented by device 140 an EDMG BRP-RX/TX packet, the EDMG BRP-RX/TX packet from a beam tracking initiator to a beam tracking responder, e.g., as described below.

In some demonstrative embodiments, the EDMG BRP-RX/TX packet may include a request for transmit beam tracking. For example, the EDMG BRP-RX/TX packet may be configured to allow the beam tracking responder to perform receive beam tracking on the EDMG BRP-RX/TX packet, e.g., as described below.

In some demonstrative embodiments, controller 124 may be configured to cause, trigger, and/or control the wireless station implemented by device 102 to communicate with device 140 a beam tracking feedback, the beam tracking feedback from the beam tracking responder to the beam tracking initiator, e.g., as described below.

In some demonstrative embodiments, the beam tracking feedback may include transmit tracking measurements performed by the beam tracking responder on the EDMG BRP-RX/TX packet from the beam tracking initiator, e.g., as described below.

In some demonstrative embodiments, controller 124 may be configured to cause, trigger, and/or control the wireless station implemented by device 102 to perform a role of the beam tracking initiator, to transmit the EDMG BRP-RX/TX packet to device 140, and to receive the beam tracking feedback from device 140, e.g., as described below.

In some demonstrative embodiments, controller 154 may be configured to cause, trigger, and/or control the wireless station implemented by device 140 to perform a role of the beam tracking responder, to receive the EDMG BRP-RX/TX packet from device 102, and to transmit the beam tracking feedback to device 102, e.g., as described below.

In some demonstrative embodiments, controller 154 may be configured to allow device 140 to perform receive beam tracking measurements on the EDMG BRP-RX/TX packet, e.g., as described below.

In some demonstrative embodiments, the EDMG BRP-RX/TX packet may include an unsolicited packet, which is unsolicited by a prior request from the beam tracking responder for receive beam tracking, e.g., as described below.

In some demonstrative embodiments, the EDMG BRP-RX/TX packet may include a non-EDMG header (L-header), e.g., L-header 206 (FIG. 2), including a "packet type" field equal to "0", and an EDMG Header A field, e.g., EDMG Header A field 208 (FIG. 2), including an "EDMG beam tracking request" field equal to "1", an "EDMG TRN length" field having a greater than zero, and an "RX Training (TRN) Units per each TX TRN-Unit" field having a value greater than zero, e.g., as described below.

In some demonstrative embodiments, a packet including the beam tracking feedback may include a feedback type field having a same value of a feedback type field in a last BRP frame from the beam tracking initiator to the beam tracking responder with a TX-TRN Request (TX-TRN-REQ) field equal to "1", e.g., as described below.

In some demonstrative embodiments, devices 102 and/or 140 may be configured to implement one or more operations to support and/or enable one or more procedures, for example, to combine transmit beam tracking and unsolicited receive beam tracking procedures into a single and more efficient procedure, e.g., as follows:

1. A beam tracking initiator sends an EDMG BRP-RX/TX packet to the beam tracking responder—with no prior request by the beam tracking responder—that the beam tracking responder:
   a) May use to perform receive beam tracking; and
   b) Shall use to perform transmit tracking measurements using the different transmit AWVs used by the beam tracking initiator in the transmission of the EDMG BRP-RX/TX packet.

2. The beam tracking responder sends feedback to the beam tracking initiator, for example, based on the transmit tracking measurements the beam tracking responder made on the EDMG BRP-RX/TX packet sent by the beam tracking initiator.

In some demonstrative embodiments, devices 102 and/or 140 may be configured to implement the transmit beam tracking and unsolicited receive beam tracking procedure, e.g., using one or more of the following operations:

1. An EDMG STA (initiator) requests simultaneous receive and transmit beam tracking to a peer EDMG STA (responder), e.g., by setting the following fields in a transmitted BRP frame:
   a) The "RX TRN-Units per Each TX TRN-Unit" field in the EDMG-Header-A to a value greater than 0;
   b) The "Beam Tracking Request" field in the L-Header equal to 0 and the "EDMG Beam Tracking Request" field in the EDMG-Header-A equal to 1; and
   c) The "EDMG TRN Length" in the EDMG-Header-A to a value greater than zero.

2. The beam tracking responder sends feedback to the beam tracking initiator, for example, based on the transmit tracking measurements the beam tracking responder made on the EDMG BRP-RX/TX packet sent by the beam tracking initiator.
   a) The beam tracking responder may append the feedback to any packet from the responder to initiator.
   b) The feedback type shall be the same as the feedback type in the last BRP frame that was transmitted from the initiator to the responder with TX-TRN-REQ equal to 1. If the responder has never received a BRP frame from the initiator with TX-TRN-REQ equal to 1, the responder shall respond with all subfields of the FBCK-TYPE field equal to 0 and set the BS-FBCK field to the AWV feedback ID corresponding to the TRN subfields transmitted with the same AWV that were received with the best quality.

In some demonstrative embodiments, devices 102 and/or 140 may be configured to implement and/or support the transmit beam tracking and unsolicited receive beam tracking according to a procedure including some or all of the operations of the transmit beam tracking and unsolicited receive beam tracking procedure described above and/or one or more additional or alternative operations, parameters, and/or procedures.

Figure 6:
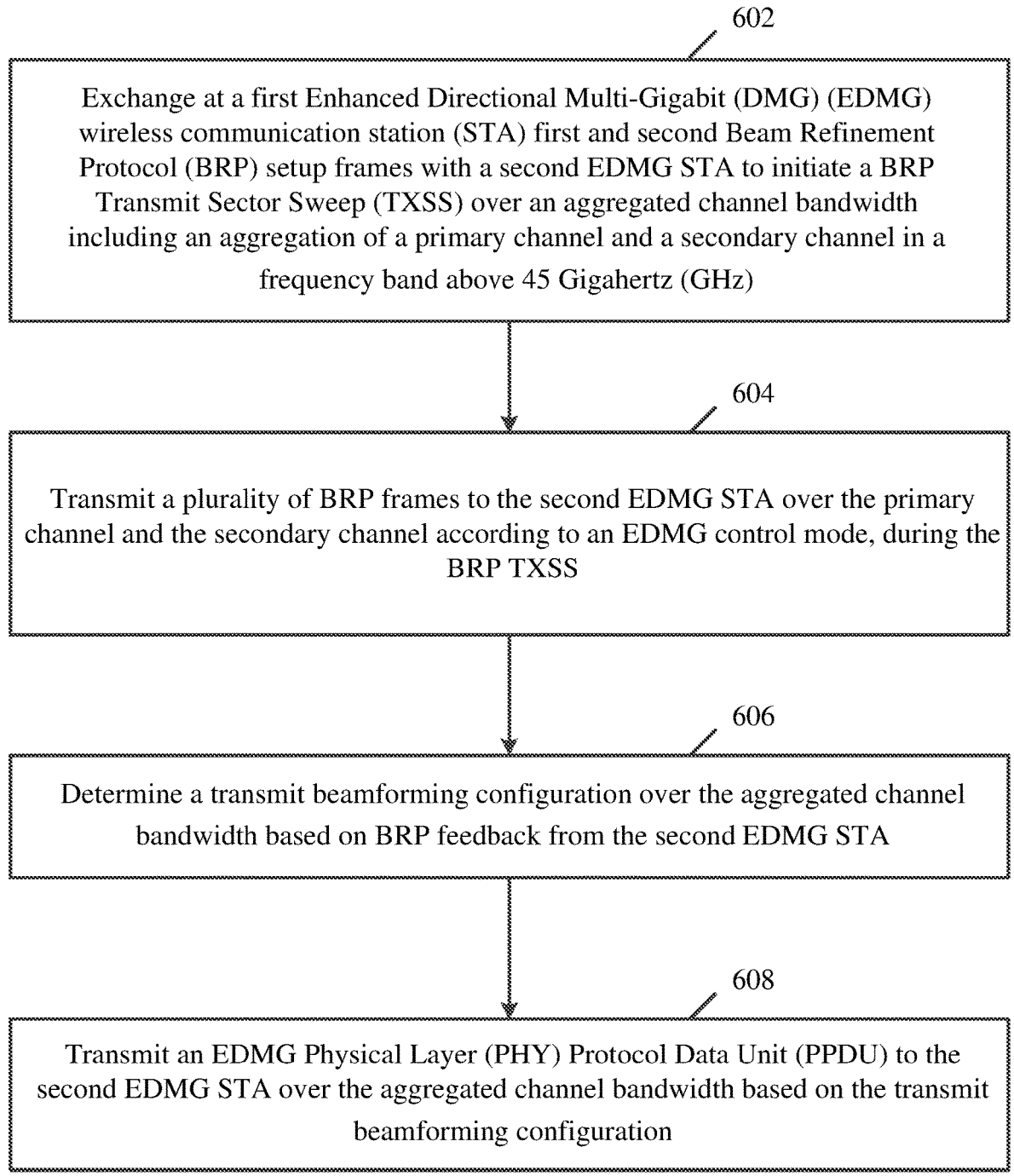
FIG. 6 is a schematic flow-chart illustration of a method of beamforming training, in accordance with some demonstrative embodiments.

Reference is made to FIG. 6, which schematically illustrates a method of beamforming training, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include exchanging at a first EDMG STA first and second BRP setup frames with a second EDMG STA to initiate a BRP TXSS over an aggregated channel bandwidth including an aggregation of a primary channel and a secondary channel in a frequency band above 45 GHz. For example, controller 124 (FIG. 1) may be configured to cause, trigger, and/or control device 102 (FIG. 1) to exchange first and second BRP setup frames with device 140 (FIG. 1) to initiate the BRP TXSS over the aggregated channel bandwidth including the aggregation of the primary channel and the secondary channel in the frequency band above 45 GHz, e.g., as described above.

As indicated at block 604, the method may include, during the BRP TXSS, transmitting a plurality of BRP frames from the first EDMG STA to the second EDMG STA over the primary channel and the secondary channel according to an EDMG control mode. For example, controller 124 (FIG. 1) may be configured to cause, trigger, and/or control device 102 (FIG. 1) to transmit, during the BRP TXSS, the plurality of BRP frames to device 140 (FIG. 1) over the primary channel and the secondary channel according to the EDMG control mode, e.g., as described above.

As indicated at block 606, the method may include determining at the first EDMG STA a transmit beamforming configuration over the aggregated channel bandwidth based on BRP feedback from the second EDMG STA. For example, controller 124 (FIG. 1) may be configured to cause, trigger, and/or control device 102 (FIG. 1) to determine the transmit beamforming configuration over the aggregated channel bandwidth based on the BRP feedback from device 140 (FIG. 1), e.g., as described above.

As indicated at block 608, the method may include transmitting an EDMG PHY PPDU from the first EDMG STA to the second EDMG STA over the aggregated channel bandwidth based on the transmit beamforming configuration. For example, controller 124 (FIG. 1) may be configured to cause, trigger, and/or control device 102 (FIG. 1) to transmit the EDMG PHY PPDU to device 140 (FIG. 1) over the aggregated channel bandwidth based on the transmit beamforming configuration, e.g., as described above.

Figure 7:
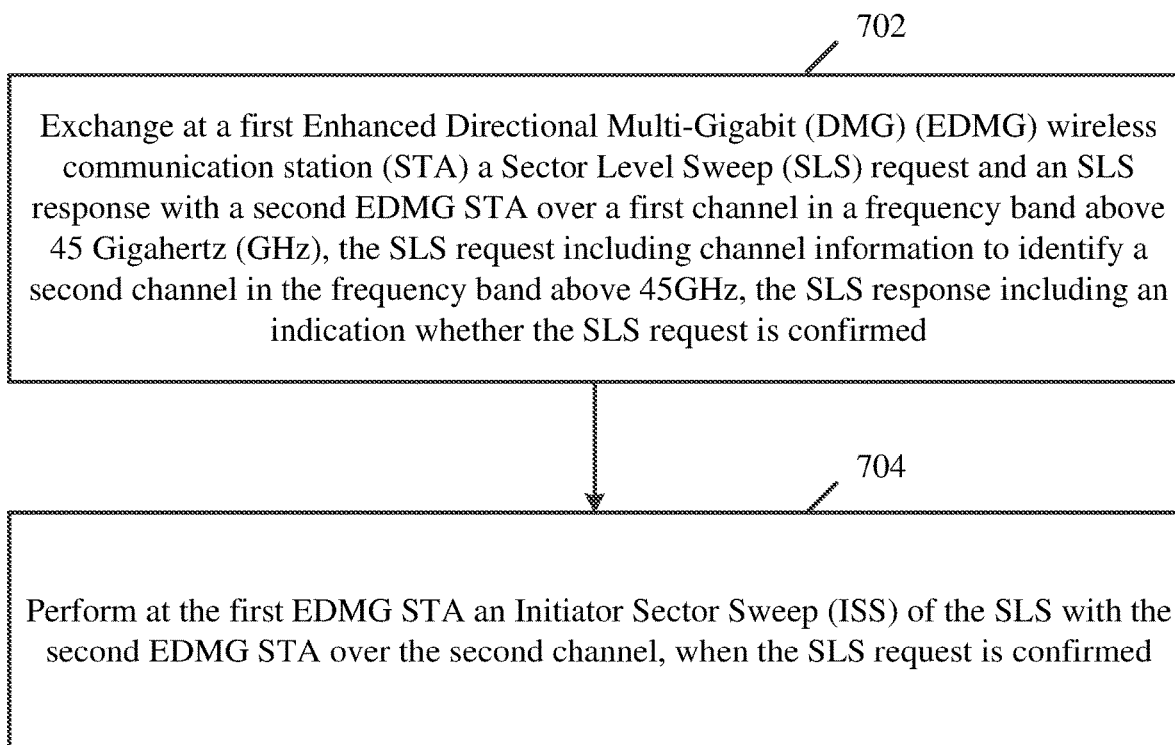
FIG. 7 is a schematic flow-chart illustration of a method of an SLS, in accordance with some demonstrative embodiments.

Reference is made to FIG. 7, which schematically illustrates a method of SLS, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include exchanging an SLS request and an SLS response between a first EDMG STA and a second EDMG STA over a first channel in a frequency band above 45 GHz, the SLS request including channel information to identify a second channel in the frequency band above 45 Ghz, the SLS response including an indication whether the SLS request is confirmed. For example, controller 124 (FIG. 1) may be configured to cause, trigger, and/or control device 102 (FIG. 1) to exchange the SLS request and the SLS response with device 140 (FIG. 1) over the first channel in the frequency band above 45 GHz, e.g., as described above.

As indicated at block 704, the method may include performing at the first EDMG STA an ISS of the SLS with the second EDMG STA over the second channel, when the SLS request is confirmed. For example, controller 124 (FIG. 1) may be configured to cause, trigger, and/or control device 102 (FIG. 1) to perform the ISS of the SLS with device 140 (FIG. 1) over the second channel, when the SLS request is confirmed, e.g., as described above.

Figure 8:
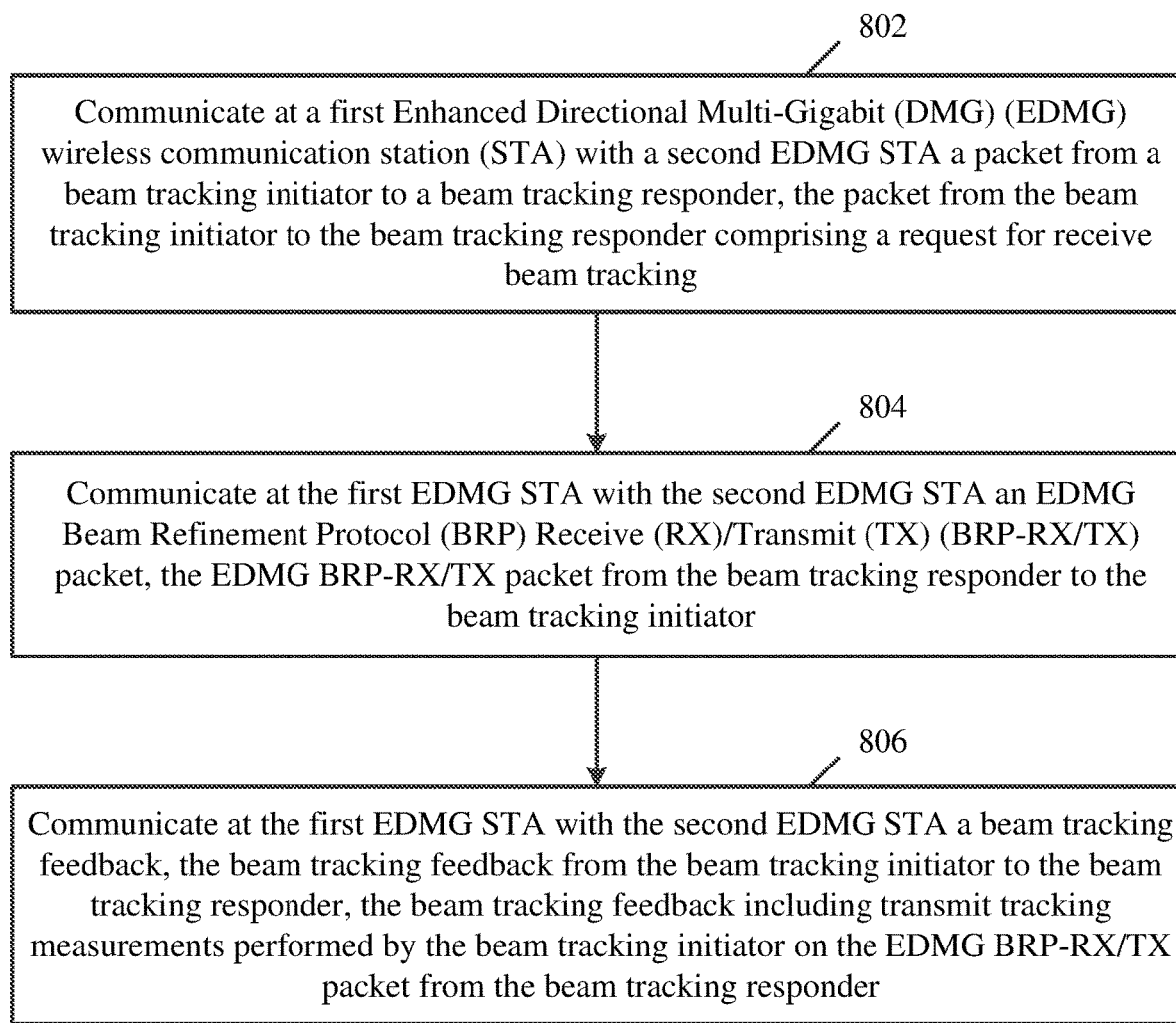
FIG. 8 is a schematic flow-chart illustration of a method of beam tracking, in accordance with some demonstrative embodiments.

Reference is made to FIG. 8, which schematically illustrates a method of beam tracking, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include communicating at a first EDMG STA with a second EDMG STA a packet from a beam tracking initiator to a beam tracking responder, the packet from the beam tracking initiator including a request for receive beam tracking. For example, controller 124 (FIG. 1) may be configured to cause, trigger, and/or control device 102 (FIG. 1) to communicate with device 140 (FIG. 1) the packet from the beam tracking initiator to the beam tracking responder, e.g., as described above.

As indicated at block 804, the method may include communicating at the first EDMG STA with the second EDMG STA an EDMG BRP-RX/TX packet, the EDMG BRP-RX/TX packet from the beam tracking responder to the beam tracking initiator. For example, controller 124 (FIG. 1) may be configured to cause, trigger, and/or control device 102 (FIG. 1) to communicate with device 140 (FIG. 1) the EDMG BRP-RX/TX packet from the beam tracking responder to the beam tracking initiator, e.g., as described above.

As indicated at block 806, the method may include communicating at the first EDMG STA with the second EDMG STA a beam tracking feedback, the beam tracking feedback from the beam tracking initiator to the beam tracking responder, the beam tracking feedback including transmit tracking measurements performed by the beam tracking initiator on the EDMG BRP-RX/TX packet from the beam tracking responder. For example, controller 124 (FIG. 1) may be configured to cause, trigger, and/or control device 102 (FIG. 1) to communicate with device 140 (FIG. 1) the beam tracking feedback, e.g., as described above.

Figure 9:
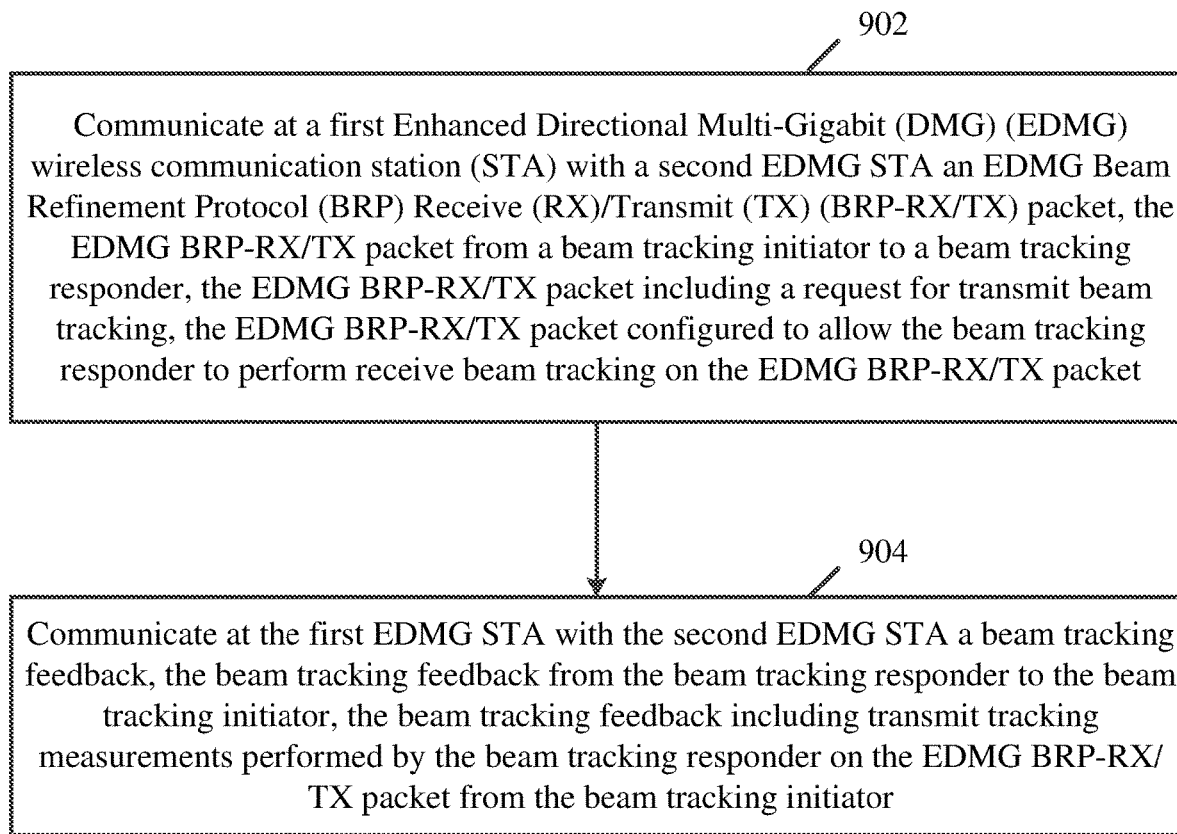
FIG. 9 is a schematic flow-chart illustration of a method of beam tracking, in accordance with some demonstrative embodiments.

Reference is made to FIG. 9, which schematically illustrates a method of beam tracking, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include communicating at a first EDMG STA with a second EDMG STA an EDMG BRP-RX/TX packet, the EDMG BRP-RX/TX packet from a beam tracking initiator to a beam tracking responder, the EDMG BRP-RX/TX packet including a request for transmit beam tracking, the EDMG BRP-RX/TX packet configured to allow the beam tracking responder to perform receive beam tracking on the EDMG BRP-RX/TX packet. For example, controller 124 (FIG. 1) may be configured to cause, trigger, and/or control device 102 (FIG. 1) to communicate with device 140 (FIG. 1) the EDMG BRP-RX/TX packet from a beam tracking initiator to a beam tracking responder, e.g., as described above.

As indicated at block 902, the method may include communicating at the first EDMG STA with the second EDMG STA a beam tracking feedback, the beam tracking feedback from the beam tracking responder to the beam tracking initiator, the beam tracking feedback including transmit tracking measurements performed by the beam tracking responder on the EDMG BRP-RX/TX packet from the beam tracking initiator. For example, controller 124 (FIG. 1) may be configured to cause, trigger, and/or control device 102 (FIG. 1) to communicate with device 140 (FIG. 1) the beam tracking feedback from the beam tracking responder to the beam tracking initiator, e.g., as described above.

Figure 10:
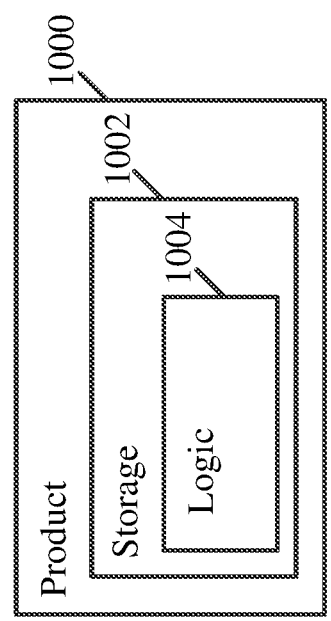
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, and/or 9, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 1000 and/or machine readable storage media 1002 may include one or more types of computer-readable storage media capable of storing data, including volatile memory, non-volatile memory, removable or non-removable memory, erasable or non-erasable memory, writeable or re-writeable memory, and the like. For example, machine readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first Enhanced Directional Multi-Gigabit (DMG) (EDMG) wireless communication station (STA) to exchange first and second Beam Refinement Protocol (BRP) setup frames with a second EDMG STA to initiate a BRP Transmit Sector Sweep (TXSS) over an aggregated channel bandwidth comprising an aggregation of a primary channel and a secondary channel in a frequency band above 45 Gigahertz (GHz); during the BRP TXSS, transmit a plurality of BRP frames to the second EDMG STA over the primary channel and the secondary channel according to an EDMG control mode; determine a transmit beamforming configuration over the aggregated channel bandwidth based on BRP feedback from the second EDMG STA; and transmit an EDMG Physical Layer (PHY) Protocol Data Unit (PPDU) to the second EDMG STA over the aggregated channel bandwidth based on the transmit beamforming configuration.

Example 2 includes the subject matter of Example 1, and optionally, wherein the apparatus is configured to cause the first EDMG STA to transmit the plurality of BRP frames while using in the secondary channel an Antenna Weight Vector (AWV) setting, which is selected by an implementation.

Example 3 includes the subject matter of Example 1 or 2, and optionally, wherein the apparatus is configured to cause the first EDMG STA to transmit a BRP frame of the plurality of BRP frames by transmitting a Training (TRN) field of the BRP frame over the primary channel and the secondary channel.

Example 4 includes the subject matter of any one of Examples 1-3, and optionally, wherein the apparatus is configured to cause the first EDMG STA to set a field in a BRP frame of the plurality of BRP frames to indicate that measurements are to be performed using a quasi-omni antenna pattern.

Example 5 includes the subject matter of Example 4, and optionally, wherein the apparatus is configured to cause the first EDMG STA to set to "1" a Training Unit (TRN-Unit) Receive (Rx) pattern field in an EDMG Header A of the BRP frame to indicate that measurements are to be performed using the quasi-omni antenna pattern.

Example 6 includes the subject matter of any one of Examples 1-5, and optionally, wherein the apparatus is configured to cause the first EDMG STA to transmit the BRP frames over the primary and secondary channels in a non-EDMG duplicate format.

Example 7 includes the subject matter of any one of Examples 1-6, and optionally, wherein a duration of a BRP data field of a BRP frame over the secondary channel is equal to a duration of the BRP data field over the primary channel.

Example 8 includes the subject matter of any one of Examples 1-7, and optionally, wherein the apparatus is configured to cause the first EDMG STA to configure a Training (TRN) field of a BRP frame over the secondary channel with a same configuration of the TRN field over the primary channel.

Example 9 includes the subject matter of any one of Examples 1-8, and optionally, wherein the apparatus is configured to cause the first EDMG STA to perform a role of an initiator of the BRP TXSS, the initiator of the BRP TXSS to transmit the first BRP setup frame, to receive the second BRP setup frame, and to transmit the BRP frames in an initiator BRP TXSS phase.

Example 10 includes the subject matter of any one of Examples 1-8, and optionally, wherein the apparatus is configured to cause the first EDMG STA to perform a role of a responder of the BRP TXSS, the responder of the BRP TXSS to receive the first BRP setup frame, to transmit the second BRP setup frame, and to transmit the BRP frames in a responder BRP TXSS phase.

Example 11 includes the subject matter of any one of Examples 1-10, and optionally, wherein the apparatus is configured to cause the first EDMG STA to setup a Sector Level Sweep (SLS) with the second EDMG STA over the secondary channel by exchanging with the second EDMG STA an SLS request and an SLS response over the primary channel, the SLS request comprising channel information to identify the secondary channel, the SLS response comprising an indication whether the SLS request is confirmed.

Example 12 includes the subject matter of Example 11, and optionally, wherein the SLS request comprises a grant frame and the SLS response comprises a grant Acknowledgement (Ack) frame, a control trailer of the grant frame comprising a channel number of the secondary channel, a control trailer of the grant Ack frame comprising the channel number of the secondary channel when the SLS request is confirmed.

Example 13 includes the subject matter of any one of Examples 1-12, and optionally, wherein the aggregated channel bandwidth comprises a 2.16+2.16 GHz channel bandwidth or a 4.32+4.32 GHz channel bandwidth.

Example 14 includes the subject matter of any one of Examples 1-13, and optionally, comprising a radio.

Example 15 includes the subject matter of any one of Examples 1-14, and optionally, comprising one or more antennas.

Example 16 includes a system of wireless communication comprising a first Enhanced Directional Multi-Gigabit (DMG) (EDMG) wireless communication station (STA), the first EDMG STA comprising a radio; a memory; a processor; one or more antennas; and a controller configured to cause the first EDMG STA to exchange first and second Beam Refinement Protocol (BRP) setup frames with a second EDMG STA to initiate a BRP Transmit Sector Sweep (TXSS) over an aggregated channel bandwidth comprising an aggregation of a primary channel and a secondary channel in a frequency band above 45 Gigahertz (GHz); during the BRP TXSS, transmit a plurality of BRP frames to the second EDMG STA over the primary channel and the secondary channel according to an EDMG control mode; determine a transmit beamforming configuration over the aggregated channel bandwidth based on BRP feedback from the second EDMG STA; and transmit an EDMG Physical Layer (PHY) Protocol Data Unit (PPDU) to the second EDMG STA over the aggregated channel bandwidth based on the transmit beamforming configuration.

Example 17 includes the subject matter of Example 16, and optionally, wherein the controller is configured to cause the first EDMG STA to transmit the plurality of BRP frames while using in the secondary channel an Antenna Weight Vector (AWV) setting, which is selected by an implementation.

Example 18 includes the subject matter of Example 16 or 17, and optionally, wherein the controller is configured to cause the first EDMG STA to transmit a BRP frame of the plurality of BRP frames by transmitting a Training (TRN) field of the BRP frame over the primary channel and the secondary channel.

Example 19 includes the subject matter of any one of Examples 16-18, and optionally, wherein the controller is configured to cause the first EDMG STA to set a field in a BRP frame of the plurality of BRP frames to indicate that measurements are to be performed using a quasi-omni antenna pattern.

Example 20 includes the subject matter of Example 19, and optionally, wherein the controller is configured to cause the first EDMG STA to set to "1" a Training Unit (TRN-Unit) Receive (Rx) pattern field in an EDMG Header A of the BRP frame to indicate that measurements are to be performed using the quasi-omni antenna pattern.

Example 21 includes the subject matter of any one of Examples 16-20, and optionally, wherein the controller is configured to cause the first EDMG STA to transmit the BRP frames over the primary and secondary channels in a non-EDMG duplicate format.

Example 22 includes the subject matter of any one of Examples 16-21, and optionally, wherein a duration of a BRP data field of a BRP frame over the secondary channel is equal to a duration of the BRP data field over the primary channel.

Example 23 includes the subject matter of any one of Examples 16-22, and optionally, wherein the controller is configured to cause the first EDMG STA to configure a Training (TRN) field of a BRP frame over the secondary channel with a same configuration of the TRN field over the primary channel.

Example 24 includes the subject matter of any one of Examples 16-23, and optionally, wherein the controller is configured to cause the first EDMG STA to perform a role of an initiator of the BRP TXSS, the initiator of the BRP TXSS to transmit the first BRP setup frame, to receive the second BRP setup frame, and to transmit the BRP frames in an initiator BRP TXSS phase.

Example 25 includes the subject matter of any one of Examples 16-23, and optionally, wherein the controller is configured to cause the first EDMG STA to perform a role of a responder of the BRP TXSS, the responder of the BRP TXSS to receive the first BRP setup frame, to transmit the second BRP setup frame, and to transmit the BRP frames in a responder BRP TXSS phase.

Example 26 includes the subject matter of any one of Examples 16-25, and optionally, wherein the controller is configured to cause the first EDMG STA to setup a Sector Level Sweep (SLS) with the second EDMG STA over the secondary channel by exchanging with the second EDMG STA an SLS request and an SLS response over the primary channel, the SLS request comprising channel information to identify the secondary channel, the SLS response comprising an indication whether the SLS request is confirmed.

Example 27 includes the subject matter of Example 26, and optionally, wherein the SLS request comprises a grant frame and the SLS response comprises a grant Acknowledgement (Ack) frame, a control trailer of the grant frame comprising a channel number of the secondary channel, a control trailer of the grant Ack frame comprising the channel number of the secondary channel when the SLS request is confirmed.

Example 28 includes the subject matter of any one of Examples 16-27, and optionally, wherein the aggregated channel bandwidth comprises a 2.16+2.16 GHz channel bandwidth or a 4.32+4.32 GHz channel bandwidth.

Example 29 includes a method to be performed at a first Enhanced Directional Multi-Gigabit (DMG) (EDMG) wireless communication station (STA), the method comprising exchanging first and second Beam Refinement Protocol (BRP) setup frames with a second EDMG STA to initiate a BRP Transmit Sector Sweep (TXSS) over an aggregated channel bandwidth comprising an aggregation of a primary channel and a secondary channel in a frequency band above 45 Gigahertz (GHz); during the BRP TXSS, transmitting a plurality of BRP frames to the second EDMG STA over the primary channel and the secondary channel according to an EDMG control mode; determining a transmit beamforming configuration over the aggregated channel bandwidth based on BRP feedback from the second EDMG STA; and transmitting an EDMG Physical Layer (PHY) Protocol Data Unit (PPDU) to the second EDMG STA over the aggregated channel bandwidth based on the transmit beamforming configuration.

Example 30 includes the subject matter of Example 29, and optionally, comprising transmitting the plurality of BRP frames while using in the secondary channel an Antenna Weight Vector (AWV) setting, which is selected by an implementation.

Example 31 includes the subject matter of Example 29 or 30, and optionally, comprising transmitting a BRP frame of the plurality of BRP frames by transmitting a Training (TRN) field of the BRP frame over the primary channel and the secondary channel.

Example 32 includes the subject matter of any one of Examples 29-31, and optionally, comprising setting a field in a BRP frame of the plurality of BRP frames to indicate that measurements are to be performed using a quasi-omni antenna pattern.

Example 33 includes the subject matter of Example 32, and optionally, comprising setting to "1" a Training Unit (TRN-Unit) Receive (Rx) pattern field in an EDMG Header A of the BRP frame to indicate that measurements are to be performed using the quasi-omni antenna pattern.

Example 34 includes the subject matter of any one of Examples 29-33, and optionally, comprising transmitting the BRP frames over the primary and secondary channels in a non-EDMG duplicate format.

Example 35 includes the subject matter of any one of Examples 29-34, and optionally, wherein a duration of a BRP data field of a BRP frame over the secondary channel is equal to a duration of the BRP data field over the primary channel.

Example 36 includes the subject matter of any one of Examples 29-35, and optionally, comprising configuring a Training (TRN) field of a BRP frame over the secondary channel with a same configuration of the TRN field over the primary channel.

Example 37 includes the subject matter of any one of Examples 29-36, and optionally, comprising causing the first EDMG STA to perform a role of an initiator of the BRP TXSS, the initiator of the BRP TXSS to transmit the first BRP setup frame, to receive the second BRP setup frame, and to transmit the BRP frames in an initiator BRP TXSS phase.

Example 38 includes the subject matter of any one of Examples 29-36, and optionally, comprising causing the first EDMG STA to perform a role of a responder of the BRP TXSS, the responder of the BRP TXSS to receive the first BRP setup frame, to transmit the second BRP setup frame, and to transmit the BRP frames in a responder BRP TXSS phase.

Example 39 includes the subject matter of any one of Examples 29-38, and optionally, comprising setting up a Sector Level Sweep (SLS) with the second EDMG STA over the secondary channel by exchanging with the second EDMG STA an SLS request and an SLS response over the primary channel, the SLS request comprising channel information to identify the secondary channel, the SLS response comprising an indication whether the SLS request is confirmed.

Example 40 includes the subject matter of Example 39, and optionally, wherein the SLS request comprises a grant frame and the SLS response comprises a grant Acknowledgement (Ack) frame, a control trailer of the grant frame comprising a channel number of the secondary channel, a control trailer of the grant Ack frame comprising the channel number of the secondary channel when the SLS request is confirmed.

Example 41 includes the subject matter of any one of Examples 29-40, and optionally, wherein the aggregated channel bandwidth comprises a 2.16+2.16 GHz channel bandwidth or a 4.32+4.32 GHz channel bandwidth.

Example 42 includes a product comprising one or more tangible computer-readable non-transitory storage media comprising computer-executable instructions operable to, when executed by at least one processor, enable the at least one processor to cause a first Enhanced Directional Multi-Gigabit (DMG) (EDMG) wireless communication station (STA) to exchange first and second Beam Refinement Protocol (BRP) setup frames with a second EDMG STA to initiate a BRP Transmit Sector Sweep (TXSS) over an aggregated channel bandwidth comprising an aggregation of a primary channel and a secondary channel in a frequency band above 45 Gigahertz (GHz); during the BRP TXSS, transmit a plurality of BRP frames to the second EDMG STA over the primary channel and the secondary channel according to an EDMG control mode; determine a transmit beamforming configuration over the aggregated channel bandwidth based on BRP feedback from the second EDMG STA; and transmit an EDMG Physical Layer (PHY) Protocol Data Unit (PPDU) to the second EDMG STA over the aggregated channel bandwidth based on the transmit beamforming configuration.

Example 43 includes the subject matter of Example 42, and optionally, wherein the instructions, when executed, cause the first EDMG STA to transmit the plurality of BRP frames while using in the secondary channel an Antenna Weight Vector (AWV) setting, which is selected by an implementation.

Example 44 includes the subject matter of Example 42 or 43, and optionally, wherein the instructions, when executed, cause the first EDMG STA to transmit a BRP frame of the plurality of BRP frames by transmitting a Training (TRN) field of the BRP frame over the primary channel and the secondary channel.

Example 45 includes the subject matter of any one of Examples 42-44, and optionally, wherein the instructions, when executed, cause the first EDMG STA to set a field in a BRP frame of the plurality of BRP frames to indicate that measurements are to be performed using a quasi-omni antenna pattern.

Example 46 includes the subject matter of Example 45, and optionally, wherein the instructions, when executed, cause the first EDMG STA to set to "1" a Training Unit (TRN-Unit) Receive (Rx) pattern field in an EDMG Header A of the BRP frame to indicate that measurements are to be performed using the quasi-omni antenna pattern.

Example 47 includes the subject matter of any one of Examples 42-46, and optionally, wherein the instructions, when executed, cause the first EDMG STA to transmit the BRP frames over the primary and secondary channels in a non-EDMG duplicate format.

Example 48 includes the subject matter of any one of Examples 42-47, and optionally, wherein a duration of a BRP data field of a BRP frame over the secondary channel is equal to a duration of the BRP data field over the primary channel.

Example 49 includes the subject matter of any one of Examples 42-48, and optionally, wherein the instructions, when executed, cause the first EDMG STA to configure a Training (TRN) field of a BRP frame over the secondary channel with a same configuration of the TRN field over the primary channel.

Example 50 includes the subject matter of any one of Examples 42-49, and optionally, wherein the instructions, when executed, cause the first EDMG STA to perform a role of an initiator of the BRP TXSS, the initiator of the BRP TXSS to transmit the first BRP setup frame, to receive the second BRP setup frame, and to transmit the BRP frames in an initiator BRP TXSS phase.

Example 51 includes the subject matter of any one of Examples 42-49, and optionally, wherein the instructions, when executed, cause the first EDMG STA to perform a role of a responder of the BRP TXSS, the responder of the BRP TXSS to receive the first BRP setup frame, to transmit the second BRP setup frame, and to transmit the BRP frames in a responder BRP TXSS phase.

Example 52 includes the subject matter of any one of Examples 42-51, and optionally, wherein the instructions, when executed, cause the first EDMG STA to setup a Sector Level Sweep (SLS) with the second EDMG STA over the secondary channel by exchanging with the second EDMG STA an SLS request and an SLS response over the primary channel, the SLS request comprising channel information to identify the secondary channel, the SLS response comprising an indication whether the SLS request is confirmed.

Example 53 includes the subject matter of Example 52, and optionally, wherein the SLS request comprises a grant frame and the SLS response comprises a grant Acknowledgement (Ack) frame, a control trailer of the grant frame comprising a channel number of the secondary channel, a control trailer of the grant Ack frame comprising the channel number of the secondary channel when the SLS request is confirmed.

Example 54 includes the subject matter of any one of Examples 42-53, and optionally, wherein the aggregated channel bandwidth comprises a 2.16+2.16 GHz channel bandwidth or a 4.32+4.32 GHz channel bandwidth.

Example 55 includes an apparatus of wireless communication by a first Enhanced Directional Multi-Gigabit (DMG) (EDMG) wireless communication station (STA), the apparatus comprising means for exchanging first and second Beam Refinement Protocol (BRP) setup frames with a second EDMG STA to initiate a BRP Transmit Sector Sweep (TXSS) over an aggregated channel bandwidth comprising an aggregation of a primary channel and a secondary channel in a frequency band above 45 Gigahertz (GHz); means for, during the BRP TXSS, transmitting a plurality of BRP frames to the second EDMG STA over the primary channel and the secondary channel according to an EDMG control mode; means for determining a transmit beamforming configuration over the aggregated channel bandwidth based on BRP feedback from the second EDMG STA; and means for transmitting an EDMG Physical Layer (PHY) Protocol Data Unit (PPDU) to the second EDMG STA over the aggregated channel bandwidth based on the transmit beamforming configuration.

Example 56 includes the subject matter of Example 55, and optionally, comprising means for transmitting the plurality of BRP frames while using in the secondary channel an Antenna Weight Vector (AWV) setting, which is selected by an implementation.

Example 57 includes the subject matter of Example 55 or 56, and optionally, comprising means for transmitting a BRP frame of the plurality of BRP frames by transmitting a Training (TRN) field of the BRP frame over the primary channel and the secondary channel.

Example 58 includes the subject matter of any one of Examples 55-57, and optionally, comprising means for setting a field in a BRP frame of the plurality of BRP frames to indicate that measurements are to be performed using a quasi-omni antenna pattern.

Example 59 includes the subject matter of Example 58, and optionally, comprising means for setting to "1" a Training Unit (TRN-Unit) Receive (Rx) pattern field in an EDMG Header A of the BRP frame to indicate that measurements are to be performed using the quasi-omni antenna pattern.

Example 60 includes the subject matter of any one of Examples 55-59, and optionally, comprising means for transmitting the BRP frames over the primary and secondary channels in a non-EDMG duplicate format.

Example 61 includes the subject matter of any one of Examples 55-60, and optionally, wherein a duration of a BRP data field of a BRP frame over the secondary channel is equal to a duration of the BRP data field over the primary channel.

Example 62 includes the subject matter of any one of Examples 55-61, and optionally, comprising means for configuring a Training (TRN) field of a BRP frame over the secondary channel with a same configuration of the TRN field over the primary channel.

Example 63 includes the subject matter of any one of Examples 55-62, and optionally, comprising means for causing the first EDMG STA to perform a role of an initiator of the BRP TXSS, the initiator of the BRP TXSS to transmit the first BRP setup frame, to receive the second BRP setup frame, and to transmit the BRP frames in an initiator BRP TXSS phase.

Example 64 includes the subject matter of any one of Examples 55-62, and optionally, comprising means for causing the first EDMG STA to perform a role of a responder of the BRP TXSS, the responder of the BRP TXSS to receive the first BRP setup frame, to transmit the second BRP setup frame, and to transmit the BRP frames in a responder BRP TXSS phase.

Example 65 includes the subject matter of any one of Examples 55-64, and optionally, comprising means for setting up a Sector Level Sweep (SLS) with the second EDMG STA over the secondary channel by exchanging with the second EDMG STA an SLS request and an SLS response over the primary channel, the SLS request comprising channel information to identify the secondary channel, the SLS response comprising an indication whether the SLS request is confirmed.

Example 66 includes the subject matter of Example 65, and optionally, wherein the SLS request comprises a grant frame and the SLS response comprises a grant Acknowledgement (Ack) frame, a control trailer of the grant frame comprising a channel number of the secondary channel, a control trailer of the grant Ack frame comprising the channel number of the secondary channel when the SLS request is confirmed.

Example 67 includes the subject matter of any one of Examples 55-66, and optionally, wherein the aggregated channel bandwidth comprises a 2.16+2.16 GHz channel bandwidth or a 4.32+4.32 GHz channel bandwidth.

Example 68 includes an apparatus comprising logic and circuitry configured to cause a first Enhanced Directional Multi-Gigabit (DMG) (EDMG) wireless communication station (STA) to exchange a Sector Level Sweep (SLS) request and an SLS response with a second EDMG STA over a first channel in a frequency band above 45 Gigahertz (GHz), the SLS request comprising channel information to identify a second channel in the frequency band above 45 Ghz, the SLS response comprising an indication whether the SLS request is confirmed; and when the SLS request is confirmed, perform an Initiator Sector Sweep (ISS) of the SLS with the second EDMG STA over the second channel.

Example 69 includes the subject matter of Example 68, and optionally, wherein the SLS request comprises a grant frame and the SLS response comprises a grant Acknowledgement (Ack) frame.

Example 70 includes the subject matter of Example 69, and optionally, wherein a control trailer of the grant frame comprises a channel number of the second channel, and a control trailer of the grant Ack frame comprises the channel number of the second channel when the SLS request is confirmed.

Example 71 includes the subject matter of Example 69 or 70, and optionally, wherein the SLS request comprises a timeout value to indicate a timeout of the SLS request relative to a time indicated by a duration field of the grant frame.

Example 72 includes the subject matter of any one of Examples 68-71, and optionally, wherein the apparatus is configured to cause the first EDMG STA to perform a role of an initiator of the SLS, the initiator of the SLS to transmit the SLS request over the first channel, to receive the SLS response over the first channel, and to transmit during the ISS one or more Sector Sweep (SSW) frames or short-SSW frames to the second EDMG STA over the second channel.

Example 73 includes the subject matter of any one of Examples 68-71, and optionally, wherein the apparatus is configured to cause the first EDMG STA to perform a role of a responder of the SLS, the responder of the SLS to receive the SLS request over the first channel, to transmit the SLS response over the first channel, and to receive during the ISS one or more Sector Sweep (SSW) frames or short-SSW frames from the second EDMG STA over the second channel.

Example 74 includes the subject matter of any one of Examples 68-73, and optionally, wherein the first channel comprises a primary channel of an aggregated channel bandwidth and the second channel comprises a secondary channel of the aggregated channel bandwidth.

Example 75 includes the subject matter of Example 74, and optionally, wherein the aggregated channel bandwidth comprises a 2.16+2.16 GHz channel bandwidth or a 4.32+4.32 GHz channel bandwidth.

Example 76 includes the subject matter of any one of Examples 68-75, and optionally, comprising a radio.

Example 77 includes the subject matter of any one of Examples 68-76, and optionally, comprising one or more antennas.

Example 78 includes a system of wireless communication comprising a first Enhanced Directional Multi-Gigabit (DMG) (EDMG) wireless communication station (STA), the first EDMG STA comprising a radio; a memory; a processor; one or more antennas; and a controller configured to cause the first EDMG STA to exchange a Sector Level Sweep (SLS) request and an SLS response with a second EDMG STA over a first channel in a frequency band above 45 Gigahertz (GHz), the SLS request comprising channel information to identify a second channel in the frequency band above 45 Ghz, the SLS response comprising an indication whether the SLS request is confirmed; and when the SLS request is confirmed, perform an Initiator Sector Sweep (ISS) of the SLS with the second EDMG STA over the second channel.

Example 79 includes the subject matter of Example 78, and optionally, wherein the SLS request comprises a grant frame and the SLS response comprises a grant Acknowledgement (Ack) frame.

Example 80 includes the subject matter of Example 79, and optionally, wherein a control trailer of the grant frame comprises a channel number of the second channel, and a control trailer of the grant Ack frame comprises the channel number of the second channel when the SLS request is confirmed.

Example 81 includes the subject matter of Example 79 or 80, and optionally, wherein the SLS request comprises a timeout value to indicate a timeout of the SLS request relative to a time indicated by a duration field of the grant frame.

Example 82 includes the subject matter of any one of Examples 78-81, and optionally, wherein the controller is configured to cause the first EDMG STA to perform a role of an initiator of the SLS, the initiator of the SLS to transmit the SLS request over the first channel, to receive the SLS response over the first channel, and to transmit during the ISS one or more Sector Sweep (SSW) frames or short-SSW frames to the second EDMG STA over the second channel.

Example 83 includes the subject matter of any one of Examples 78-81, and optionally, wherein the controller is configured to cause the first EDMG STA to perform a role of a responder of the SLS, the responder of the SLS to receive the SLS request over the first channel, to transmit the SLS response over the first channel, and to receive during the ISS one or more Sector Sweep (SSW) frames or short-SSW frames from the second EDMG STA over the second channel.

Example 84 includes the subject matter of any one of Examples 78-83, and optionally, wherein the first channel comprises a primary channel of an aggregated channel bandwidth and the second channel comprises a secondary channel of the aggregated channel bandwidth.

Example 85 includes the subject matter of Example 84, and optionally, wherein the aggregated channel bandwidth comprises a 2.16+2.16 GHz channel bandwidth or a 4.32+4.32 GHz channel bandwidth.

Example 86 includes a method to be performed at a first Enhanced Directional Multi-Gigabit (DMG) (EDMG) wireless communication station (STA), the method comprising exchanging a Sector Level Sweep (SLS) request and an SLS response with a second EDMG STA over a first channel in a frequency band above 45 Gigahertz (GHz), the SLS request comprising channel information to identify a second channel in the frequency band above 45 Ghz, the SLS response comprising an indication whether the SLS request is confirmed; and when the SLS request is confirmed, performing an Initiator Sector Sweep (ISS) of the SLS with the second EDMG STA over the second channel.

Example 87 includes the subject matter of Example 86, and optionally, wherein the SLS request comprises a grant frame and the SLS response comprises a grant Acknowledgement (Ack) frame.

Example 88 includes the subject matter of Example 87, and optionally, wherein a control trailer of the grant frame comprises a channel number of the second channel, and a control trailer of the grant Ack frame comprises the channel number of the second channel when the SLS request is confirmed.

Example 89 includes the subject matter of Example 87 or 88, and optionally, wherein the SLS request comprises a timeout value to indicate a timeout of the SLS request relative to a time indicated by a duration field of the grant frame.

Example 90 includes the subject matter of any one of Examples 86-89, and optionally, comprising causing the first EDMG STA to perform a role of an initiator of the SLS, the initiator of the SLS to transmit the SLS request over the first channel, to receive the SLS response over the first channel, and to transmit during the ISS one or more Sector Sweep (SSW) frames or short-SSW frames to the second EDMG STA over the second channel.

Example 91 includes the subject matter of any one of Examples 86-89, and optionally, comprising causing the first EDMG STA to perform a role of a responder of the SLS, the responder of the SLS to receive the SLS request over the first channel, to transmit the SLS response over the first channel, and to receive during the ISS one or more Sector Sweep (SSW) frames or short-SSW frames from the second EDMG STA over the second channel.

Example 92 includes the subject matter of any one of Examples 86-91, and optionally, wherein the first channel comprises a primary channel of an aggregated channel bandwidth and the second channel comprises a secondary channel of the aggregated channel bandwidth.

Example 93 includes the subject matter of Example 92, and optionally, wherein the aggregated channel bandwidth comprises a 2.16+2.16 GHz channel bandwidth or a 4.32+4.32 GHz channel bandwidth.

Example 94 includes a product comprising one or more tangible computer-readable non-transitory storage media comprising computer-executable instructions operable to, when executed by at least one processor, enable the at least one processor to cause a first Enhanced Directional Multi-Gigabit (DMG) (EDMG) wireless communication station (STA) to exchange a Sector Level Sweep (SLS) request and an SLS response with a second EDMG STA over a first channel in a frequency band above 45 Gigahertz (GHz), the SLS request comprising channel information to identify a second channel in the frequency band above 45 Ghz, the SLS response comprising an indication whether the SLS request is confirmed; and when the SLS request is confirmed, perform an Initiator Sector Sweep (ISS) of the SLS with the second EDMG STA over the second channel.

Example 95 includes the subject matter of Example 94, and optionally, wherein the SLS request comprises a grant frame and the SLS response comprises a grant Acknowledgement (Ack) frame.

Example 96 includes the subject matter of Example 95, and optionally, wherein a control trailer of the grant frame comprises a channel number of the second channel, and a control trailer of the grant Ack frame comprises the channel number of the second channel when the SLS request is confirmed.

Example 97 includes the subject matter of Example 95 or 96, and optionally, wherein the SLS request comprises a timeout value to indicate a timeout of the SLS request relative to a time indicated by a duration field of the grant frame.

Example 98 includes the subject matter of any one of Examples 94-97, and optionally, wherein the instructions, when executed, cause the first EDMG STA to perform a role of an initiator of the SLS, the initiator of the SLS to transmit the SLS request over the first channel, to receive the SLS response over the first channel, and to transmit during the ISS one or more Sector Sweep (SSW) frames or short-SSW frames to the second EDMG STA over the second channel.

Example 99 includes the subject matter of any one of Examples 94-97, and optionally, wherein the instructions, when executed, cause the first EDMG STA to perform a role of a responder of the SLS, the responder of the SLS to receive the SLS request over the first channel, to transmit the SLS response over the first channel, and to receive during the ISS one or more Sector Sweep (SSW) frames or short-SSW frames from the second EDMG STA over the second channel.

Example 100 includes the subject matter of any one of Examples 94-99, and optionally, wherein the first channel comprises a primary channel of an aggregated channel bandwidth and the second channel comprises a secondary channel of the aggregated channel bandwidth.

Example 101 includes the subject matter of Example 100, and optionally, wherein the aggregated channel bandwidth comprises a 2.16+2.16 GHz channel bandwidth or a 4.32+4.32 GHz channel bandwidth.

Example 102 includes an apparatus of wireless communication by a first Enhanced Directional Multi-Gigabit (DMG) (EDMG) wireless communication station (STA), the apparatus comprising means for exchanging a Sector Level Sweep (SLS) request and an SLS response with a second EDMG STA over a first channel in a frequency band above 45 Gigahertz (GHz), the SLS request comprising channel information to identify a second channel in the frequency band above 45 Ghz, the SLS response comprising an indication whether the SLS request is confirmed; and means for, when the SLS request is confirmed, performing an Initiator Sector Sweep (ISS) of the SLS with the second EDMG STA over the second channel.

Example 103 includes the subject matter of Example 102, and optionally, wherein the SLS request comprises a grant frame and the SLS response comprises a grant Acknowledgement (Ack) frame.

Example 104 includes the subject matter of Example 103, and optionally, wherein a control trailer of the grant frame comprises a channel number of the second channel, and a control trailer of the grant Ack frame comprises the channel number of the second channel when the SLS request is confirmed.

Example 105 includes the subject matter of Example 103 or 104, and optionally, wherein the SLS request comprises a timeout value to indicate a timeout of the SLS request relative to a time indicated by a duration field of the grant frame.

Example 106 includes the subject matter of any one of Examples 102-105, and optionally, comprising means for causing the first EDMG STA to perform a role of an initiator of the SLS, the initiator of the SLS to transmit the SLS request over the first channel, to receive the SLS response over the first channel, and to transmit during the ISS one or more Sector Sweep (SSW) frames or short-SSW frames to the second EDMG STA over the second channel.

Example 107 includes the subject matter of any one of Examples 102-105, and optionally, comprising means for causing the first EDMG STA to perform a role of a responder of the SLS, the responder of the SLS to receive the SLS request over the first channel, to transmit the SLS response over the first channel, and to receive during the ISS one or more Sector Sweep (SSW) frames or short-SSW frames from the second EDMG STA over the second channel.

Example 108 includes the subject matter of any one of Examples 102-107, and optionally, wherein the first channel comprises a primary channel of an aggregated channel bandwidth and the second channel comprises a secondary channel of the aggregated channel bandwidth.

Example 109 includes the subject matter of Example 108, and optionally, wherein the aggregated channel bandwidth comprises a 2.16+2.16 GHz channel bandwidth or a 4.32+4.32 GHz channel bandwidth.

Example 110 includes an apparatus comprising logic and circuitry configured to cause a first Enhanced Directional Multi-Gigabit (DMG) (EDMG) wireless communication station (STA) to communicate with a second EDMG STA a packet from a beam tracking initiator to a beam tracking responder, the packet from the beam tracking initiator to the beam tracking responder comprising a request for receive beam tracking; communicate with the second EDMG STA an EDMG Beam Refinement Protocol (BRP) Receive (RX)/Transmit (TX) (BRP-RX/TX) packet, the EDMG BRP-RX/TX packet from the beam tracking responder to the beam tracking initiator; and communicate with the second EDMG STA a beam tracking feedback, the beam tracking feedback from the beam tracking initiator to the beam tracking responder, the beam tracking feedback comprising transmit tracking measurements performed by the beam tracking initiator on the EDMG BRP-RX/TX packet from the beam tracking responder.

Example 111 includes the subject matter of Example 110, and optionally, wherein the packet from the beam tracking initiator to the beam tracking responder comprises an EDMG Header A field comprising an "EDMG Training (TRN) length" field having a value equal to a number of requested TRN-Units, which is greater than zero, and wherein an EDMG Header A field of the EDMG BRP-RX/TX packet comprises an "RX TRN Units per each TX TRN-Unit" field having a value equal to the value of the EDMG TRN length field.

Example 112 includes the subject matter of Example 111, and optionally, wherein the packet from the beam tracking initiator to the beam tracking responder comprises a non-EDMG header (L-header) comprising a "packet type" field equal to "0" and a "beam tracking request field" equal to "0", wherein the EDMG Header A field of the packet from the beam tracking initiator to the beam tracking responder comprises an "EDMG beam tracking request" field equal to "1", and wherein an "RX TRN-Units per each TX TRN-Unit" field in the EDMG Header A field of the EDMG BRP-RX packet is equal to "0".

Example 113 includes the subject matter of any one of Examples 110-112, and optionally, wherein a packet comprising the beam tracking feedback comprises a feedback type field having a same value of a feedback type field in a last BRP frame from the beam tracking responder to the beam tracking initiator with a TX-TRN Request (TX-TRN-REQ) field equal to "1".

Example 114 includes the subject matter of any one of Examples 110-113, and optionally, wherein the apparatus is configured to cause the first EDMG STA to perform a role of the beam tracking initiator, to transmit the packet from the beam tracking initiator to the beam tracking responder to the second EDMG STA, to receive the EDMG BRP-RX/TX packet from the second EDMG STA, and to transmit the beam tracking feedback to the second EDMG STA.

Example 115 includes the subject matter of Example 114, and optionally, wherein the apparatus is configured to allow the first EDMG STA to perform receive beam tracking measurements on the EDMG BRP-RX/TX packet.

Example 116 includes the subject matter of any one of Examples 110-113, and optionally, wherein the apparatus is configured to cause the first EDMG STA to perform a role of the beam tracking responder, to receive the packet from the beam tracking initiator to the beam tracking responder from the second EDMG STA, to transmit the EDMG BRP-RX/TX packet to the second EDMG STA, and to receive the beam tracking feedback from the second EDMG STA.

Example 117 includes the subject matter of any one of Examples 110-116, and optionally, comprising a radio.

Example 118 includes the subject matter of any one of Examples 110-117, and optionally, comprising one or more antennas.

Example 119 includes a system of wireless communication comprising a first Enhanced Directional Multi-Gigabit (DMG) (EDMG) wireless communication station (STA), the first EDMG STA comprising a radio; a memory; a processor; one or more antennas; and a controller configured to cause the first EDMG STA to communicate with a second EDMG STA a packet from a beam tracking initiator to a beam tracking responder, the packet from the beam tracking initiator to the beam tracking responder comprising a request for receive beam tracking; communicate with the second EDMG STA an EDMG Beam Refinement Protocol (BRP) Receive (RX)/Transmit (TX) (BRP-RX/TX) packet, the EDMG BRP-RX/TX packet from the beam tracking responder to the beam tracking initiator; and communicate with the second EDMG STA a beam tracking feedback, the beam tracking feedback from the beam tracking initiator to the beam tracking responder, the beam tracking feedback comprising transmit tracking measurements performed by the beam tracking initiator on the EDMG BRP-RX/TX packet from the beam tracking responder.

Example 120 includes the subject matter of Example 119, and optionally, wherein the packet from the beam tracking initiator to the beam tracking responder comprises an EDMG Header A field comprising an "EDMG Training (TRN) length" field having a value equal to a number of requested TRN-Units, which is greater than zero, and wherein an EDMG Header A field of the EDMG BRP-RX/TX packet comprises an "RX TRN Units per each TX TRN-Unit" field having a value equal to the value of the EDMG TRN length field.

Example 121 includes the subject matter of Example 120, and optionally, wherein the packet from the beam tracking initiator to the beam tracking responder comprises a non-EDMG header (L-header) comprising a "packet type" field equal to "0" and a "beam tracking request field" equal to "0", wherein the EDMG Header A field of the packet from the beam tracking initiator to the beam tracking responder comprises an "EDMG beam tracking request" field equal to "1", and wherein an "RX TRN-Units per each TX TRN-Unit" field in the EDMG Header A field of the EDMG BRP-RX packet is equal to "0".

Example 122 includes the subject matter of any one of Examples 119-121, and optionally, wherein a packet comprising the beam tracking feedback comprises a feedback type field having a same value of a feedback type field in a last BRP frame from the beam tracking responder to the beam tracking initiator with a TX-TRN Request (TX-TRN-REQ) field equal to "1".

Example 123 includes the subject matter of any one of Examples 119-122, and optionally, wherein the controller is configured to cause the first EDMG STA to perform a role of the beam tracking initiator, to transmit the packet from the beam tracking initiator to the beam tracking responder to the second EDMG STA, to receive the EDMG BRP-RX/TX packet from the second EDMG STA, and to transmit the beam tracking feedback to the second EDMG STA.

Example 124 includes the subject matter of Example 123, and optionally, wherein the controller is configured to allow the first EDMG STA to perform receive beam tracking measurements on the EDMG BRP-RX/TX packet.

Example 125 includes the subject matter of any one of Examples 119-122, and optionally, wherein the controller is configured to cause the first EDMG STA to perform a role of the beam tracking responder, to receive the packet from the beam tracking initiator to the beam tracking responder from the second EDMG STA, to transmit the EDMG BRP- RX/TX packet to the second EDMG STA, and to receive the beam tracking feedback from the second EDMG STA.

Example 126 includes a method to be performed at a first Enhanced Directional Multi-Gigabit (DMG) (EDMG) wireless communication station (STA), the method comprising communicating with a second EDMG STA a packet from a beam tracking initiator to a beam tracking responder, the packet from the beam tracking initiator to the beam tracking responder comprising a request for receive beam tracking; communicating with the second EDMG STA an EDMG Beam Refinement Protocol (BRP) Receive (RX)/Transmit (TX) (BRP-RX/TX) packet, the EDMG BRP-RX/TX packet from the beam tracking responder to the beam tracking initiator; and communicating with the second EDMG STA a beam tracking feedback, the beam tracking feedback from the beam tracking initiator to the beam tracking responder, the beam tracking feedback comprising transmit tracking measurements performed by the beam tracking initiator on the EDMG BRP-RX/TX packet from the beam tracking responder.

Example 127 includes the subject matter of Example 126, and optionally, wherein the packet from the beam tracking initiator to the beam tracking responder comprises an EDMG Header A field comprising an "EDMG Training (TRN) length" field having a value equal to a number of requested TRN-Units, which is greater than zero, and wherein an EDMG Header A field of the EDMG BRP-RX/TX packet comprises an "RX TRN Units per each TX TRN-Unit" field having a value equal to the value of the EDMG TRN length field.

Example 128 includes the subject matter of Example 127, and optionally, wherein the packet from the beam tracking initiator to the beam tracking responder comprises a non-EDMG header (L-header) comprising a "packet type" field equal to "0" and a "beam tracking request field" equal to "0", wherein the EDMG Header A field of the packet from the beam tracking initiator to the beam tracking responder comprises an "EDMG beam tracking request" field equal to "1", and wherein an "RX TRN-Units per each TX TRN-Unit" field in the EDMG Header A field of the EDMG BRP-RX packet is equal to "0".

Example 129 includes the subject matter of any one of Examples 126-128, and optionally, wherein a packet comprising the beam tracking feedback comprises a feedback type field having a same value of a feedback type field in a last BRP frame from the beam tracking responder to the beam tracking initiator with a TX-TRN Request (TX-TRN-REQ) field equal to "1".

Example 130 includes the subject matter of any one of Examples 126-129, and optionally, comprising causing the first EDMG STA to perform a role of the beam tracking initiator, to transmit the packet from the beam tracking initiator to the beam tracking responder to the second EDMG STA, to receive the EDMG BRP-RX/TX packet from the second EDMG STA, and to transmit the beam tracking feedback to the second EDMG STA.

Example 131 includes the subject matter of Example 130, and optionally, comprising allowing the first EDMG STA to perform receive beam tracking measurements on the EDMG BRP-RX/TX packet.

Example 132 includes the subject matter of any one of Examples 126-129, and optionally, comprising causing the first EDMG STA to perform a role of the beam tracking responder, to receive the packet from the beam tracking initiator to the beam tracking responder from the second EDMG STA, to transmit the EDMG BRP-RX/TX packet to the second EDMG STA, and to receive the beam tracking feedback from the second EDMG STA.

Example 133 includes a product comprising one or more tangible computer-readable non-transitory storage media comprising computer-executable instructions operable to, when executed by at least one processor, enable the at least one processor to cause a first Enhanced Directional Multi-Gigabit (DMG) (EDMG) wireless communication station (STA) to communicate with a second EDMG STA a packet from a beam tracking initiator to a beam tracking responder, the packet from the beam tracking initiator to the beam tracking responder comprising a request for receive beam tracking; communicate with the second EDMG STA an EDMG Beam Refinement Protocol (BRP) Receive (RX)/Transmit (TX) (BRP-RX/TX) packet, the EDMG BRP-RX/TX packet from the beam tracking responder to the beam tracking initiator; and communicate with the second EDMG STA a beam tracking feedback, the beam tracking feedback from the beam tracking initiator to the beam tracking responder, the beam tracking feedback comprising transmit tracking measurements performed by the beam tracking initiator on the EDMG BRP-RX/TX packet from the beam tracking responder.

Example 134 includes the subject matter of Example 133, and optionally, wherein the packet from the beam tracking initiator to the beam tracking responder comprises an EDMG Header A field comprising an "EDMG Training (TRN) length" field having a value equal to a number of requested TRN-Units, which is greater than zero, and wherein an EDMG Header A field of the EDMG BRP-RX/TX packet comprises an "RX TRN Units per each TX TRN-Unit" field having a value equal to the value of the EDMG TRN length field.

Example 135 includes the subject matter of Example 134, and optionally, wherein the packet from the beam tracking initiator to the beam tracking responder comprises a non-EDMG header (L-header) comprising a "packet type" field equal to "0" and a "beam tracking request field" equal to "0", wherein the EDMG Header A field of the packet from the beam tracking initiator to the beam tracking responder comprises an "EDMG beam tracking request" field equal to "1", and wherein an "RX TRN-Units per each TX TRN-Unit" field in the EDMG Header A field of the EDMG BRP-RX packet is equal to "0".

Example 136 includes the subject matter of any one of Examples 133-135, and optionally, wherein a packet comprising the beam tracking feedback comprises a feedback type field having a same value of a feedback type field in a last BRP frame from the beam tracking responder to the beam tracking initiator with a TX-TRN Request (TX-TRN-REQ) field equal to "1".

Example 137 includes the subject matter of any one of Examples 133-136, and optionally, wherein the instructions, when executed, cause the first EDMG STA to perform a role of the beam tracking initiator, to transmit the packet from the beam tracking initiator to the beam tracking responder to the second EDMG STA, to receive the EDMG BRP-RX/TX packet from the second EDMG STA, and to transmit the beam tracking feedback to the second EDMG STA.

Example 138 includes the subject matter of Example 137, and optionally, wherein the instructions, when executed, allow the first EDMG STA to perform receive beam tracking measurements on the EDMG BRP-RX/TX packet.

Example 139 includes the subject matter of any one of Examples 133-136, and optionally, wherein the instructions, when executed, cause the first EDMG STA to perform a role of the beam tracking responder, to receive the packet from the beam tracking initiator to the beam tracking responder from the second EDMG STA, to transmit the EDMG BRP-RX/TX packet to the second EDMG STA, and to receive the beam tracking feedback from the second EDMG STA.

Example 140 includes an apparatus of wireless communication by a first Enhanced Directional Multi-Gigabit (DMG) (EDMG) wireless communication station (STA), the apparatus comprising means for communicating with a second EDMG STA a packet from a beam tracking initiator to a beam tracking responder, the packet from the beam tracking initiator to the beam tracking responder comprising a request for receive beam tracking; means for communicating with the second EDMG STA an EDMG Beam Refinement Protocol (BRP) Receive (RX)/Transmit (TX) (BRP-RX/TX) packet, the EDMG BRP-RX/TX packet from the beam tracking responder to the beam tracking initiator; and means for communicating with the second EDMG STA a beam tracking feedback, the beam tracking feedback from the beam tracking initiator to the beam tracking responder, the beam tracking feedback comprising transmit tracking measurements performed by the beam tracking initiator on the EDMG BRP-RX/TX packet from the beam tracking responder.

Example 141 includes the subject matter of Example 140, and optionally, wherein the packet from the beam tracking initiator to the beam tracking responder comprises an EDMG Header A field comprising an "EDMG Training (TRN) length" field having a value equal to a number of requested TRN-Units, which is greater than zero, and wherein an EDMG Header A field of the EDMG BRP-RX/TX packet comprises an "RX TRN Units per each TX TRN-Unit" field having a value equal to the value of the EDMG TRN length field.

Example 142 includes the subject matter of Example 141, and optionally, wherein the packet from the beam tracking initiator to the beam tracking responder comprises a non-EDMG header (L-header) comprising a "packet type" field equal to "0" and a "beam tracking request field" equal to "0", wherein the EDMG Header A field of the packet from the beam tracking initiator to the beam tracking responder comprises an "EDMG beam tracking request" field equal to "1", and wherein an "RX TRN-Units per each TX TRN-Unit" field in the EDMG Header A field of the EDMG BRP-RX packet is equal to "0".

Example 143 includes the subject matter of any one of Examples 140-142, and optionally, wherein a packet comprising the beam tracking feedback comprises a feedback type field having a same value of a feedback type field in a last BRP frame from the beam tracking responder to the beam tracking initiator with a TX-TRN Request (TX-TRN-REQ) field equal to "1".

Example 144 includes the subject matter of any one of Examples 140-143, and optionally, comprising means for causing the first EDMG STA to perform a role of the beam tracking initiator, to transmit the packet from the beam tracking initiator to the beam tracking responder to the second EDMG STA, to receive the EDMG BRP-RX/TX packet from the second EDMG STA, and to transmit the beam tracking feedback to the second EDMG STA.

Example 145 includes the subject matter of Example 144, and optionally, comprising means for allowing the first EDMG STA to perform receive beam tracking measurements on the EDMG BRP-RX/TX packet.

Example 146 includes the subject matter of any one of Examples 140-143, and optionally, comprising means for causing the first EDMG STA to perform a role of the beam tracking responder, to receive the packet from the beam tracking initiator to the beam tracking responder from the second EDMG STA, to transmit the EDMG BRP-RX/TX packet to the second EDMG STA, and to receive the beam tracking feedback from the second EDMG STA.

Example 147 includes an apparatus comprising logic and circuitry configured to cause a first Enhanced Directional Multi-Gigabit (DMG) (EDMG) wireless communication station (STA) to communicate with a second EDMG STA an EDMG Beam Refinement Protocol (BRP) Receive (RX)/Transmit (TX) (BRP-RX/TX) packet, the EDMG BRP-RX/TX packet from a beam tracking initiator to a beam tracking responder, the EDMG BRP-RX/TX packet comprising a request for transmit beam tracking, the EDMG BRP-RX/TX packet configured to allow the beam tracking responder to perform receive beam tracking on the EDMG BRP-RX/TX packet; and communicate with the second EDMG STA a beam tracking feedback, the beam tracking feedback from the beam tracking responder to the beam tracking initiator, the beam tracking feedback comprising transmit tracking measurements performed by the beam tracking responder on the EDMG BRP-RX/TX packet from the beam tracking initiator.

Example 148 includes the subject matter of Example 147, and optionally, wherein the EDMG BRP-RX/TX packet comprises an unsolicited packet, which is unsolicited by a prior request from the beam tracking responder for receive beam tracking.

Example 149 includes the subject matter of Example 147 or 148, and optionally, wherein the EDMG BRP-RX/TX packet comprises a non-EDMG header (L-header) comprising a "packet type" field equal to "0", and an EDMG Header A field comprising an "EDMG beam tracking request" field equal to "1", an "EDMG Training (TRN) length" field having a greater than zero, and an "RX TRN Units per each TX TRN-Unit" field having a value greater than zero.

Example 150 includes the subject matter of any one of Examples 147-149, and optionally, wherein a packet comprising the beam tracking feedback comprises a feedback type field having a same value of a feedback type field in a last BRP frame from the beam tracking initiator to the beam tracking responder with a TX-TRN Request (TX-TRN-REQ) field equal to "1".

Example 151 includes the subject matter of any one of Examples 147-150, and optionally, wherein the apparatus is configured to cause the first EDMG STA to perform a role of the beam tracking initiator, to transmit the EDMG BRP-RX/TX packet to the second EDMG STA, and to receive the beam tracking feedback from the second EDMG STA.

Example 152 includes the subject matter of any one of Examples 147-150, and optionally, wherein the apparatus is configured to cause the first EDMG STA to perform a role of the beam tracking responder, to receive the EDMG BRP-RX/TX packet from the second EDMG STA, and to transmit the beam tracking feedback to the second EDMG STA.

Example 153 includes the subject matter of Example 152, and optionally, wherein the apparatus is configured to allow the first EDMG STA to perform receive beam tracking measurements on the EDMG BRP-RX/TX packet.

Example 154 includes the subject matter of any one of Examples 147-153, and optionally, comprising a radio.

Example 155 includes the subject matter of any one of Examples 147-154, and optionally, comprising one or more antennas.

Example 156 includes a system of wireless communication comprising a first Enhanced Directional Multi-Gigabit (DMG) (EDMG) wireless communication station (STA), the first EDMG STA comprising a radio; a memory; a processor; one or more antennas; and a controller configured to cause the first EDMG STA to communicate with a second EDMG STA an EDMG Beam Refinement Protocol (BRP) Receive (RX)/Transmit (TX) (BRP-RX/TX) packet, the EDMG BRP-RX/TX packet from a beam tracking initiator to a beam tracking responder, the EDMG BRP-RX/TX packet comprising a request for transmit beam tracking, the EDMG BRP-RX/TX packet configured to allow the beam tracking responder to perform receive beam tracking on the EDMG BRP-RX/TX packet; and communicate with the second EDMG STA a beam tracking feedback, the beam tracking feedback from the beam tracking responder to the beam tracking initiator, the beam tracking feedback comprising transmit tracking measurements performed by the beam tracking responder on the EDMG BRP-RX/TX packet from the beam tracking initiator.

Example 157 includes the subject matter of Example 156, and optionally, wherein the EDMG BRP-RX/TX packet comprises an unsolicited packet, which is unsolicited by a prior request from the beam tracking responder for receive beam tracking.

Example 158 includes the subject matter of Example 156 or 157, and optionally, wherein the EDMG BRP-RX/TX packet comprises a non-EDMG header (L-header) comprising a "packet type" field equal to "0", and an EDMG Header A field comprising an "EDMG beam tracking request" field equal to "1", an "EDMG Training (TRN) length" field having a greater than zero, and an "RX TRN Units per each TX TRN-Unit" field having a value greater than zero.

Example 159 includes the subject matter of any one of Examples 156-158, and optionally, wherein a packet comprising the beam tracking feedback comprises a feedback type field having a same value of a feedback type field in a last BRP frame from the beam tracking initiator to the beam tracking responder with a TX-TRN Request (TX-TRN-REQ) field equal to "1".

Example 160 includes the subject matter of any one of Examples 156-159, and optionally, wherein the controller is configured to cause the first EDMG STA to perform a role of the beam tracking initiator, to transmit the EDMG BRP-RX/TX packet to the second EDMG STA, and to receive the beam tracking feedback from the second EDMG STA.

Example 161 includes the subject matter of any one of Examples 156-159, and optionally, wherein the controller is configured to cause the first EDMG STA to perform a role of the beam tracking responder, to receive the EDMG BRP-RX/TX packet from the second EDMG STA, and to transmit the beam tracking feedback to the second EDMG STA.

Example 162 includes the subject matter of Example 161, and optionally, wherein the controller is configured to allow the first EDMG STA to perform receive beam tracking measurements on the EDMG BRP-RX/TX packet.

Example 163 includes a method to be performed at a first Enhanced Directional Multi-Gigabit (DMG) (EDMG) wireless communication station (STA), the method comprising communicating with a second EDMG STA an EDMG Beam Refinement Protocol (BRP) Receive (RX)/Transmit (TX) (BRP-RX/TX) packet, the EDMG BRP-RX/TX packet from a beam tracking initiator to a beam tracking responder, the EDMG BRP-RX/TX packet comprising a request for transmit beam tracking, the EDMG BRP-RX/TX packet configured to allow the beam tracking responder to perform receive beam tracking on the EDMG BRP-RX/TX packet; and communicating with the second EDMG STA a beam tracking feedback, the beam tracking feedback from the beam tracking responder to the beam tracking initiator, the beam tracking feedback comprising transmit tracking measurements performed by the beam tracking responder on the EDMG BRP-RX/TX packet from the beam tracking initiator.

Example 164 includes the subject matter of Example 163, and optionally, wherein the EDMG BRP-RX/TX packet comprises an unsolicited packet, which is unsolicited by a prior request from the beam tracking responder for receive beam tracking.

Example 165 includes the subject matter of Example 163 or 164, and optionally, wherein the EDMG BRP-RX/TX packet comprises a non-EDMG header (L-header) comprising a "packet type" field equal to "0", and an EDMG Header A field comprising an "EDMG beam tracking request" field equal to "1", an "EDMG Training (TRN) length" field having a greater than zero, and an "RX TRN Units per each TX TRN-Unit" field having a value greater than zero.

Example 166 includes the subject matter of any one of Examples 163-165, and optionally, wherein a packet comprising the beam tracking feedback comprises a feedback type field having a same value of a feedback type field in a last BRP frame from the beam tracking initiator to the beam tracking responder with a TX-TRN Request (TX-TRN-REQ) field equal to "1".

Example 167 includes the subject matter of any one of Examples 163-166, and optionally, comprising causing the first EDMG STA to perform a role of the beam tracking initiator, to transmit the EDMG BRP-RX/TX packet to the second EDMG STA, and to receive the beam tracking feedback from the second EDMG STA.

Example 168 includes the subject matter of any one of Examples 163-166, and optionally, comprising causing the first EDMG STA to perform a role of the beam tracking responder, to receive the EDMG BRP-RX/TX packet from the second EDMG STA, and to transmit the beam tracking feedback to the second EDMG STA.

Example 169 includes the subject matter of Example 168, and optionally, comprising allowing the first EDMG STA to perform receive beam tracking measurements on the EDMG BRP-RX/TX packet.

Example 170 includes a product comprising one or more tangible computer-readable non-transitory storage media comprising computer-executable instructions operable to, when executed by at least one processor, enable the at least one processor to cause a first Enhanced Directional Multi-Gigabit (DMG) (EDMG) wireless communication station (STA) to communicate with a second EDMG STA an EDMG Beam Refinement Protocol (BRP) Receive (RX)/Transmit (TX) (BRP-RX/TX) packet, the EDMG BRP-RX/TX packet from a beam tracking initiator to a beam tracking responder, the EDMG BRP-RX/TX packet comprising a request for transmit beam tracking, the EDMG BRP-RX/TX packet configured to allow the beam tracking responder to perform receive beam tracking on the EDMG BRP-RX/TX packet; and communicate with the second EDMG STA a beam tracking feedback, the beam tracking feedback from the beam tracking responder to the beam tracking initiator, the beam tracking feedback comprising transmit tracking measurements performed by the beam tracking responder on the EDMG BRP-RX/TX packet from the beam tracking initiator.

Example 171 includes the subject matter of Example 170, and optionally, wherein the EDMG BRP-RX/TX packet comprises an unsolicited packet, which is unsolicited by a prior request from the beam tracking responder for receive beam tracking.

Example 172 includes the subject matter of Example 170 or 171, and optionally, wherein the EDMG BRP-RX/TX packet comprises a non-EDMG header (L-header) comprising a "packet type" field equal to "0", and an EDMG Header A field comprising an "EDMG beam tracking request" field equal to "1", an "EDMG Training (TRN) length" field having a greater than zero, and an "RX TRN Units per each TX TRN-Unit" field having a value greater than zero.

Example 173 includes the subject matter of any one of Examples 170-172, and optionally, wherein a packet comprising the beam tracking feedback comprises a feedback type field having a same value of a feedback type field in a last BRP frame from the beam tracking initiator to the beam tracking responder with a TX-TRN Request (TX-TRN-REQ) field equal to "1".

Example 174 includes the subject matter of any one of Examples 170-173, and optionally, wherein the instructions, when executed, cause the first EDMG STA to perform a role of the beam tracking initiator, to transmit the EDMG BRP-RX/TX packet to the second EDMG STA, and to receive the beam tracking feedback from the second EDMG STA.

Example 175 includes the subject matter of any one of Examples 170-173, and optionally, wherein the instructions, when executed, cause the first EDMG STA to perform a role of the beam tracking responder, to receive the EDMG BRP-RX/TX packet from the second EDMG STA, and to transmit the beam tracking feedback to the second EDMG STA.

Example 176 includes the subject matter of Example 175, and optionally, wherein the instructions, when executed, allow the first EDMG STA to perform receive beam tracking measurements on the EDMG BRP-RX/TX packet.

Example 177 includes an apparatus of wireless communication by a first Enhanced Directional Multi-Gigabit (DMG) (EDMG) wireless communication station (STA), the apparatus comprising means for communicating with a second EDMG STA an EDMG Beam Refinement Protocol (BRP) Receive (RX)/Transmit (TX) (BRP-RX/TX) packet, the EDMG BRP-RX/TX packet from a beam tracking initiator to a beam tracking responder, the EDMG BRP-RX/TX packet comprising a request for transmit beam tracking, the EDMG BRP-RX/TX packet configured to allow the beam tracking responder to perform receive beam tracking on the EDMG BRP-RX/TX packet; and means for communicating with the second EDMG STA a beam tracking feedback, the beam tracking feedback from the beam tracking responder to the beam tracking initiator, the beam tracking feedback comprising transmit tracking measurements performed by the beam tracking responder on the EDMG BRP-RX/TX packet from the beam tracking initiator.

Example 178 includes the subject matter of Example 177, and optionally, wherein the EDMG BRP-RX/TX packet comprises an unsolicited packet, which is unsolicited by a prior request from the beam tracking responder for receive beam tracking.

Example 179 includes the subject matter of Example 177 or 178, and optionally, wherein the EDMG BRP-RX/TX packet comprises a non-EDMG header (L-header) comprising a "packet type" field equal to "0", and an EDMG Header A field comprising an "EDMG beam tracking request" field equal to "1", an "EDMG Training (TRN) length" field having a greater than zero, and an "RX TRN Units per each TX TRN-Unit" field having a value greater than zero.

Example 180 includes the subject matter of any one of Examples 177-179, and optionally, wherein a packet comprising the beam tracking feedback comprises a feedback type field having a same value of a feedback type field in a last BRP frame from the beam tracking initiator to the beam tracking responder with a TX-TRN Request (TX-TRN-REQ) field equal to "1".

Example 181 includes the subject matter of any one of Examples 177-180, and optionally, comprising means for causing the first EDMG STA to perform a role of the beam tracking initiator, to transmit the EDMG BRP-RX/TX packet to the second EDMG STA, and to receive the beam tracking feedback from the second EDMG STA.

Example 182 includes the subject matter of any one of Examples 177-180, and optionally, comprising means for causing the first EDMG STA to perform a role of the beam tracking responder, to receive the EDMG BRP-RX/TX packet from the second EDMG STA, and to transmit the beam tracking feedback to the second EDMG STA.

Example 183 includes the subject matter of Example 182, and optionally, comprising means for allowing the first EDMG STA to perform receive beam tracking measurements on the EDMG BRP-RX/TX packet.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    a processor comprising logic and circuitry configured to cause a beam tracking responder to:
        process a first packet from a beam tracking initiator, the first packet from the beam tracking initiator comprising a request for receive beam tracking;
        transmit an Enhanced Directional Multi-Gigabit (DMG) (EDMG) Beam Refinement Protocol (BRP) Receive (RX)/Transmit (TX) (BRP-RX/TX) packet to the beam tracking initiator in response to the request for receive beam tracking, the EDMG BRP-RX/TX packet configured for simultaneous receive and transmit training; and
        process a second packet from the beam tracking initiator, the second packet from the beam tracking initiator comprising feedback from the beam tracking initiator based on the EDMG BRP-RX/TX packet; and
    a memory to store information processed by the processor.

2. The apparatus of claim 1, wherein the first packet from the beam tracking initiator comprises an EDMG Header A comprising an "EDMG Training (TRN) length" field having a value equal to a number of requested TRN-Units, which is greater than zero.

3. The apparatus of claim 2, wherein an EDMG Header A of the EDMG BRP-RX/TX packet comprises an "RX TRN Units per each TX TRN-Unit" field having a value equal to the value of the EDMG TRN length field in the first packet from the beam tracking initiator.

4. The apparatus of claim 1, wherein the second packet from the beam tracking initiator comprises a feedback type, which is the same as a feedback type in a last BRP frame from the beam tracking responder to the beam tracking initiator with a Tx Training (TRN) Request (Tx-TRN-REQ) equal to 1.

5. The apparatus of claim 1, wherein the second packet from the beam tracking initiator comprises a feedback type (FBCK-Type) field with all subfields equal to "0", and a field comprising an Antenna Weight Vector (AWV) feedback Identifier (ID) corresponding to Training (TRN) subfields received with a best quality.

6. The apparatus of claim 1, wherein the first packet from the beam tracking initiator comprises a non-EDMG Header (L-Header) comprising a packet type field equal to "0", and an EDMG Header A comprising an "EDMG Training (TRN) length" field having a value of a number of requested TRN units.

7. The apparatus of claim 1, wherein a "beam tracking request" field of the EDMG BRP-RX/TX packet comprises a value of "0".

8. The apparatus of claim 1, wherein the feedback from the beam tracking initiator is based on transmit training measurements on one or more Training (TRN) fields of the EDMG BRP-RX/TX packet.

9. The apparatus of claim 1, wherein the EDMG BRP-RX/TX packet is configured for use by the beam tracking initiator for the receive training.

10. The apparatus of claim 1 comprising a radio, the processor configured to cause the radio to transmit the EDMG BRP-RX/TX packet.

11. The apparatus of claim 10 comprising one or more antennas connected to the radio, and another processor to execute instructions of an operating system.

12. A product comprising one or more tangible computer-readable non-transitory storage media comprising computer-executable instructions operable to, when executed by at least one processor, enable the at least one processor to cause a beam tracking responder to:
  process a first packet from a beam tracking initiator, the first packet from the beam tracking initiator comprising a request for receive beam tracking;
  transmit an Enhanced Directional Multi-Gigabit (DMG) (EDMG) Beam Refinement Protocol (BRP) Receive (RX)/Transmit (TX) (BRP-RX/TX) packet to the beam tracking initiator in response to the request for receive beam tracking, the EDMG BRP-RX/TX packet configured for simultaneous receive and transmit training; and
  process a second packet from the beam tracking initiator, the second packet from the beam tracking initiator comprising feedback from the beam tracking initiator based on the EDMG BRP-RX/TX packet.

13. The product of claim 12, wherein the first packet from the beam tracking initiator comprises an EDMG Header A comprising an "EDMG Training (TRN) length" field having a value equal to a number of requested TRN-Units, which is greater than zero.

14. An apparatus comprising:
  a processor comprising logic and circuitry configured to cause a beam tracking initiator to:
    transmit a first packet to a beam tracking responder, the first packet to the beam tracking responder comprising a request for receive beam tracking;
    process an Enhanced Directional Multi-Gigabit (DMG) (EDMG) Beam Refinement Protocol (BRP) Receive (RX)/Transmit (TX) (BRP-RX/TX) packet from the beam tracking responder in response to the request for receive beam tracking, the EDMG BRP-RX/TX packet configured for simultaneous receive and transmit training; and
    transmit a second packet to the beam tracking responder, the second packet to the beam tracking responder comprising feedback from the beam tracking initiator based on the EDMG BRP-RX/TX packet; and
  a memory to store information processed by the processor.

15. The apparatus of claim 14, wherein the first packet to the beam tracking responder comprises an EDMG Header A comprising an "EDMG Training (TRN) length" field having a value equal to a number of requested TRN-Units, which is greater than zero.

16. The apparatus of claim 15, wherein an EDMG Header A of the EDMG BRP-RX/TX packet comprises an "RX TRN Units per each TX TRN-Unit" field having a value equal to the value of the EDMG TRN length field in the first packet to the beam tracking responder.

17. The apparatus of claim 14 configured to cause the beam tracking initiator to set in the second packet a feedback type, which is the same as a feedback type in a last BRP frame from the beam tracking responder to the beam tracking initiator with a Tx Training (TRN) Request (Tx-TRN-REQ) equal to 1.

18. The apparatus of claim 14 configured to cause the beam tracking initiator to, when a BRP frame with a Tx Training (TRN) Request (Tx-TRN-REQ) equal to 1 is not received from the beam tracking responder, set in the second packet:
  a feedback type (FBCK-Type) field with all subfields equal to "0", and
  a field comprising an Antenna Weight Vector (AWV) feedback Identifier (ID) corresponding to TRN subfields received with a best quality.

19. The apparatus of claim 14, wherein the first packet to the beam tracking responder comprises a non-EDMG Header (L-Header) comprising a packet type field equal to "0", and an EDMG Header A comprising an "EDMG Training (TRN) length" field having a value of a number of requested TRN units.

20. The apparatus of claim 14, wherein the feedback from the beam tracking initiator is based on transmit training measurements on one or more Training (TRN) fields of the EDMG BRP-RX/TX packet.

21. The apparatus of claim 14 configured to cause beam tracking initiator to use the EDMG BRP-RX/TX packet for the receive training.

22. The apparatus of claim 14 comprising a radio, the processor configured to cause the radio to transmit the first and second packets to the beam tracking responder.

23. The apparatus of claim 22 comprising one or more antennas connected to the radio, and another processor to execute instructions of an operating system.

24. An apparatus comprising:
  means for causing a beam tracking initiator to transmit a first packet to a beam tracking responder, the first packet to the beam tracking responder comprising a request for receive beam tracking;
  means for processing an Enhanced Directional Multi-Gigabit (DMG) (EDMG) Beam Refinement Protocol (BRP) Receive (RX)/Transmit (TX) (BRP-RX/TX) packet from the beam tracking responder in response to the request for receive beam tracking, the EDMG BRP-RX/TX packet configured for simultaneous receive and transmit training; and means for causing the beam tracking initiator to transmit a second packet to the beam tracking responder, the second packet to the beam tracking responder comprising feedback from the beam tracking initiator based on the EDMG BRP-RX/TX packet.

25. The apparatus of claim 24 comprising means for setting in the second packet a feedback type, which is the same as a feedback type in a last BRP frame from the beam tracking responder to the beam tracking initiator with a Tx Training (TRN) Request (Tx-TRN-REQ) equal to 1.

* * * * *